United States Patent
Beck et al.

(10) Patent No.: US 11,479,105 B2
(45) Date of Patent: Oct. 25, 2022

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Matthias Horn, Tettnang (DE); Johannes Kaltenbach, Friedrichshafen (DE); Uwe Griesmeier, Markdorf (DE); Fabian Kutter, Kressbronn (DE); Thomas Martin, Weissensberg (DE); Michael Wechs, Weißensberg (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/293,964

(22) PCT Filed: Oct. 14, 2019

(86) PCT No.: PCT/EP2019/077680
§ 371 (c)(1),
(2) Date: May 14, 2021

(87) PCT Pub. No.: WO2020/099041
PCT Pub. Date: May 22, 2020

(65) Prior Publication Data
US 2022/0009332 A1    Jan. 13, 2022

(30) Foreign Application Priority Data
Nov. 16, 2018  (DE) ................. 10 2018 219 628.1

(51) Int. Cl.
*B60K 6/365*    (2007.10)
*F16H 3/66*    (2006.01)
(Continued)

(52) U.S. Cl.
CPC ............. *B60K 6/365* (2013.01); *B60K 6/387* (2013.01); *B60K 6/44* (2013.01); *B60K 6/547* (2013.01);
(Continued)

(58) Field of Classification Search
CPC ............... F16H 3/66; F16H 2200/0073; F16H 2200/2048; F16H 2200/2064;
(Continued)

(56) References Cited

U.S. PATENT DOCUMENTS

2005/0209760 A1\* 9/2005 Tabata .................... B60K 6/547
  701/53
2005/0245349 A1\* 11/2005 Tabata .................. B60W 30/19
  477/3

(Continued)

FOREIGN PATENT DOCUMENTS

DE    102014218610 A1    3/2016
DE    102015209647 A1    12/2016
(Continued)

OTHER PUBLICATIONS

International Search Report (English Translation) PCT/EP2019/077680, dated Nov. 27, 2019 (2 pages).

*Primary Examiner* — Timothy Hannon
*Assistant Examiner* — Farhana Pervin
(74) *Attorney, Agent, or Firm* — Dority & Manning, P.A.

(57) ABSTRACT

A transmission (G) for a motor vehicle includes an electric machine (EM1), a first input shaft (GW1), a second input shaft (GW2), an output shaft (GWA), three planetary gear sets (P1, P2, P3), and at least six shift elements (A, B, C, D, E, F). Different gears are implementable by selectively actuating the at least six shift elements (A, B, C, D, E, F), and different operating modes are implementable by selectively actuating the at least six shift elements (A, B, C, D, E,
(Continued)

F) in interaction with the electric machine (EM1). A drive train for a motor vehicle with the transmission (G) and a method for operating the transmission (G) are also provided.

12 Claims, 21 Drawing Sheets

(51) Int. Cl.
    *B60K 6/387*     (2007.10)
    *B60K 6/44*     (2007.10)
    *B60K 6/547*     (2007.10)

(52) U.S. Cl.
    CPC ............... *F16H 2200/0078* (2013.01); *F16H 2200/201* (2013.01); *F16H 2200/2046* (2013.01); *F16H 2200/2048* (2013.01); *F16H 2200/2051* (2013.01); *F16H 2200/2064* (2013.01); *F16H 2200/2094* (2013.01); *F16H 2200/2097* (2013.01)

(58) Field of Classification Search
    CPC ..... F16H 2200/2094; F16H 2200/2097; F16H 2200/201–2017; F16H 2200/2046–2061; B60K 1/02; B60Y 2200/91
    See application file for complete search history.

(56) References Cited

U.S. PATENT DOCUMENTS

| | | | |
|---|---|---|---|
| 2005/0261102 A1* | 11/2005 | Gumpoltsberger | F16H 3/663 475/276 |
| 2006/0229152 A1* | 10/2006 | Bucknor | B60K 6/445 475/5 |
| 2007/0197335 A1* | 8/2007 | Raghavan | B60K 6/40 475/5 |
| 2015/0377326 A1* | 12/2015 | Kato | F16H 3/666 475/275 |
| 2018/0087609 A1* | 3/2018 | Horen | F16H 3/66 |
| 2018/0156315 A1 | 6/2018 | Beck et al. | |

FOREIGN PATENT DOCUMENTS

| | | |
|---|---|---|
| DE | 102015211038 A1 | 12/2016 |
| DE | 102015226681 A1 | 6/2017 |

* cited by examiner

| Gear | Engaged Shifting Elements ||||||
|---|---|---|---|---|---|---|
| | A | B | C | D | E | F |
| 1 | X | | | | X | |
| 2 | X | | | X | | |
| 3.1 | X | X | | | | |
| 3.2 | | X | | | | X |
| 3.3 | | X | | X | | |
| 3.4 | | X | | X | | |
| 3.5 | | | | | X | |
| 4.1 | X | | X | | | |
| 4.2 | | | X | | | X |
| 4.3 | | | X | X | | |
| 4.4 | | | X | | X | |
| ZG | | | | | X | X |

| Gear | Engaged Shifting Elements ||||||
|---|---|---|---|---|---|---|
| | A | B | C | D | E | F |
| E1 | X | | | | | |
| E2 | | | | | | X |

| Gear | Engaged Shifting Elements ||||||
|---|---|---|---|---|---|---|
| | A | B | C | D | E | F |
| V3 | | X | | | | |
| V4 | | | X | | | |

| Gear | Engaged Shifting Elements | | | | | |
|---|---|---|---|---|---|---|
| | A | B | C | D | E | F |
| E1 | x | | | | x | |
| E2 | x | | | x | | |
| E3.1 | x | x | | | | |
| E3.2 | | x | | | | x |
| E3.3 | | | | x | | x |
| E3.4 | | x | | x | | |
| E3.5 | | x | | | x | |
| E4.1 | x | | x | | | |
| E4.2 | | | x | | | x |
| E4.3 | | | x | x | | |
| E4.4 | | | x | | x | |
| EZG | | | | | x | x |

| Gear | Engaged Shifting Elements | | | | | |
|---|---|---|---|---|---|---|
| | A | B | C | D | E | F |
| E1 (EM1) | x | | | | | |
| E2 (EM1) | | | | | | x |
| E3 (EM2) | | x | | | | |
| E4 (EM2) | | | x | | | |

| Gear | Engaged Shifting Elements | | | | | |
|---|---|---|---|---|---|---|
| | A | B | C | D | E | F |
| H1 | x | | | | x | |
| H2 | x | | | | | x |
| H3.1 | x | x | | | | |
| H3.2 | | x | | | | x |
| H3.3 | | x | | x | | |
| H3.4 | | x | | x | | |
| H3.5 | | x | | | x | |
| H4.1 | x | | x | | | |
| H4.2 | | | x | | | x |
| H4.3 | | | x | x | | |
| H4.4 | | | x | | x | |
| HZG | | | | | x | x |

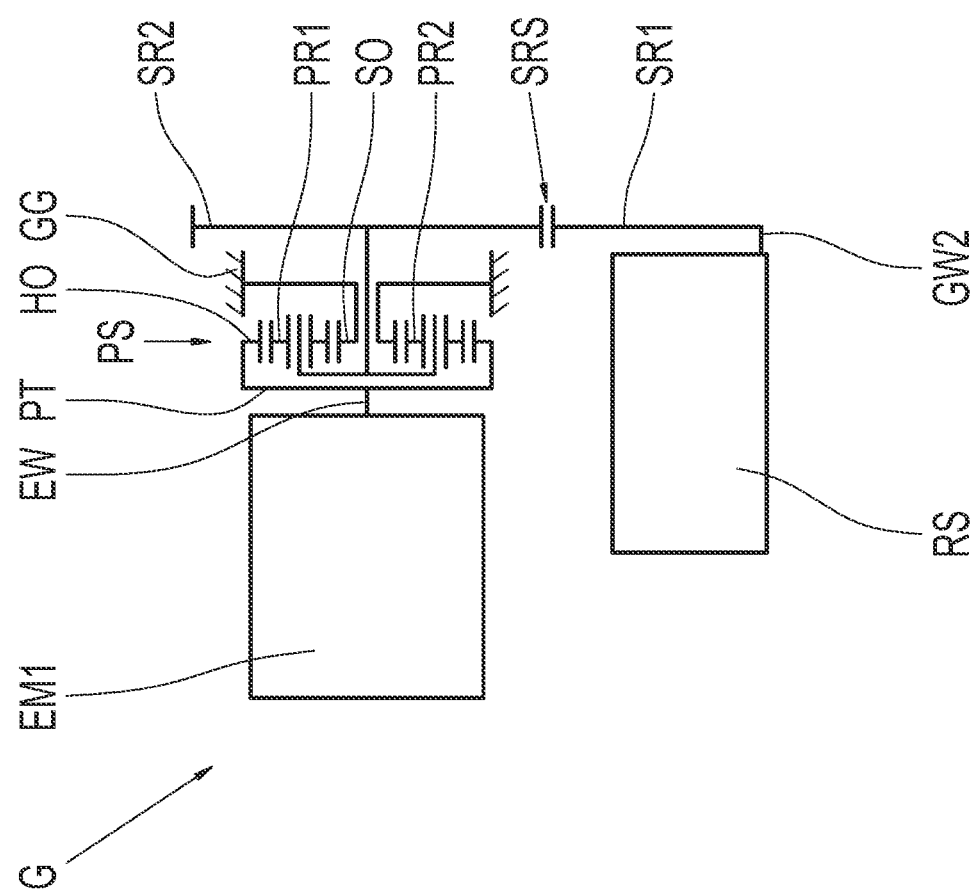

TRANSMISSION FOR A MOTOR VEHICLE

CROSS-REFERENCE TO RELATED APPLICATIONS

The present application is related and has right of priority to German Patent Application No. 102018219628.1 filed in the German Patent Office on Nov. 16, 2018 and is a nationalization of PCT/EP2019/077680 filed in the European Patent Office on Oct. 14, 2019, both of which are incorporated by reference in their entirety for all purposes.

FIELD OF THE INVENTION

The invention relates generally to a transmission for a motor vehicle. Moreover, the invention relates generally to a motor vehicle drive train, in which the transmission is utilized, and to a method for operating a transmission.

BACKGROUND

In the case of hybrid vehicles, transmissions are known which also include, in addition to a gear set, one or multiple electric machine(s). In this case, the transmission is usually configured to be multi-stage, i.e., multiple different ratios are selectable, as gears, between an input shaft and an output shaft by actuating appropriate shift elements, wherein the gear shifts are preferably automatically carried out. Depending on the arrangement of the shift elements, the shift elements are clutches or also brakes. The transmission is utilized in this case for suitably implementing an available tractive force of a prime mover of the motor vehicle with respect to various criteria. In this case, the gears of the transmission are mostly also utilized in interaction with the at least one electric machine for implementing purely electric driving. Frequently, the at least one electric machine can also be integrated in the transmission in order to implement various operating modes in different ways.

DE 10 2014 218 610 A1 describes a transmission for a hybrid vehicle, which includes, in addition to a first input shaft and an output shaft, three planetary gear sets and an electric machine. Moreover, in one variant, six shift elements are provided, via which different power paths are achieved from the first input shaft to the output shaft while implementing different gears and, in addition, different integrations of the electric machine can be configured. Here, purely electric driving can also be implemented simply by transmitting power via the electric machine.

BRIEF SUMMARY OF THE INVENTION

Example aspects of the present invention provide an alternative to the transmission for a motor vehicle known from the prior art, with which, with a compact design, different operating modes can be implemented in a suitable way.

According to example aspects of the invention, a transmission includes an electric machine, a first input shaft, a second input shaft, an output shaft, as well as a first planetary gear set, a second planetary gear set, and a third planetary gear set. The planetary gear sets include multiple elements, wherein, preferably, a first element, a second element, and a third element are associated with each of the planetary gear sets. In addition, a first shift element, a second shift element, a third shift element, a fourth shift element, a fifth shift element, and a sixth shift element are provided, via the selective actuation of which different power paths are implementable while shifting different gears. It is particularly preferred when at least four different gears can be formed, by the ratio, between the first input shaft and the output shaft. Moreover, a rotor of the electric machine is connected to the second input shaft.

Within the meaning of the invention, a "shaft" is understood to be a rotatable component of the transmission, via which associated components of the transmission are rotationally fixed to each other or via which a connection of this type is established upon actuation of an appropriate shift element. The particular shaft can connect the components to each other axially or radially or also both axially and radially. The particular shaft can also be present as an intermediate piece, via which a particular component is connected, for example, radially.

Within the meaning of the invention, "axially" means an orientation in the direction of a longitudinal central axis, along which the planetary gear sets are arranged coaxially to one another. "Radially" is then understood to mean an orientation in the direction of the diameter of a shaft that lies on this longitudinal central axis.

Preferably, the output shaft of the transmission includes a tooth system, via which the output shaft is then operatively connected, in the motor vehicle drive train, to a differential gear arranged axially parallel to the output shaft. In this case, the tooth system is preferably provided at a mounting interface of the output shaft, wherein this mounting interface of the output shaft is preferably situated axially in the area of an end of the transmission, at which a mounting interface of the first input shaft is also provided, the mounting interface establishing the connection to the upstream prime mover. This type of arrangement is particularly suitable for the application in a motor vehicle with a drive train aligned transversely to the direction of travel of the motor vehicle.

Alternatively, an output of the transmission can also be provided, in principle, at an axial end of the transmission situated opposite to a mounting interface of the first input shaft. In this case, a mounting interface of the output shaft is then designed at an axial end of the output shaft coaxially to a mounting interface of the first input shaft, so that the input and the output of the transmission are located at opposite axial ends of the transmission. A transmission configured in this way is suitable for the application in a motor vehicle with a drive train aligned in the direction of travel of the motor vehicle.

According to a first example variant, the planetary gear sets are preferably arranged in the sequence first planetary gear set, second planetary gear set, and, finally, third planetary gear set axially following the mounting interface of the first input shaft. Within the scope of an alternative, second example variant of the invention, however, the planetary gear sets are located axially in the sequence third planetary gear set, second planetary gear set, and, finally, first planetary gear set.

Example aspects of the invention now encompasses the technical teaching that the first input shaft is rotationally fixed to the second element of the first planetary gear set. The second input shaft is rotationally fixed to the third element of the second planetary gear set. The first element of the first planetary gear set is fixed at a rotationally fixed component.

With respect to the third planetary gear set, three couplings exist. A first coupling exists between the first element of the third planetary gear set and the rotationally fixed component. A second coupling exists between the second element of the third planetary gear set and the output shaft. A third coupling exists between the third element of the third planetary gear set and the second element of the second planetary gear set. It is essential that, of these couplings, two couplings are present as rotationally fixed connections, while the remaining coupling is establishable as a rotationally fixed connection via the first shift element.

Moreover, the second shift element is designed for rotationally fixing the output shaft to the input shaft. The third shift element is designed for rotationally fixing the output shaft to the third element of the first planetary gear set. The fourth shift element is designed for rotationally fixing the first input shaft to the third element of the third planetary gear set. The fifth shift element is designed for rotationally fixing the first input shaft to the second input shaft.

The sixth shift element is designed for interlocking the third planetary gear set or connecting the output shaft to the second element of the second planetary gear set. If one planetary gear set is interlocked, the ratio is always one regardless of the number of teeth. In other words, the planetary gear set revolves as a block.

For example, the sixth shift element can be arranged and designed in such a way that, in the actuated condition, the sixth shift element connects the first element with the second element of the third planetary gear set. However, the sixth shift element can also be arranged and designed in such a way that, in the actuated condition, the sixth shift element connects the first element with the third element of the third planetary gear set. The sixth shift element can also be arranged and designed in such a way that, in the actuated condition, the sixth shift element connects the second element with the third element of the third planetary gear set.

The second shift element, the third shift element, the fourth shift element, the fifth shift element, and the sixth shift element are present as clutches, which, upon actuation, each synchronize, if necessary, the particular components of the transmission joined directly to the clutches, with respect to their turning motions and, thereafter, connect the components to each other in a rotationally fixed manner. However, the first shift element is designed as a clutch or designed as a brake, depending on the variant, which, upon actuation, decelerates the components joined directly thereto to a standstill, if necessary, and, thereafter, fixes them.

A particular rotationally fixed connection of the rotatable components of the transmission is preferably implemented, according to example aspects of the invention, via one or also multiple intermediate shaft(s), which can also be present, in this case, as short intermediate pieces when the components are positioned in a spatially dense manner. Specifically, the components that are permanently rotationally fixed to each other can each be present either as individual components that are rotationally fixed to each other, or also as single pieces. In the second case mentioned above, the particular components and the optionally present shaft are then formed by one common component, wherein this is implemented, in particular, for the case in which the particular components are situated spatially close to one another in the transmission.

In the case of components of the transmission that are rotationally fixed to each other only upon actuation of a particular shift element, a connection is also preferably implemented via one or also multiple intermediate shaft(s).

A fixation takes place, in particular, by way of a rotationally fixed connection to a rotationally fixed component of the transmission, which is preferably a permanently non-rotating component, preferably a housing of the transmission, a part of such a housing, or a component rotationally fixed thereto.

Within the meaning of the invention, the "connection" of the rotor of the electric machine to the second input shaft of the transmission is to be understood as a connection of such a type that a constant rotational-speed dependence prevails between the rotor of the electric machine and the second input shaft.

Overall, a transmission according to example aspects of the invention is distinguished by a compact design, low component loads, good gearing efficiency, and low losses.

According to one example embodiment of the invention, the first shift element is arranged and designed in such a way that, in the actuated condition, the first shift element fixes the first element of the third planetary gear set at the rotationally fixed component, whereas the second element of the third planetary gear set is permanently connected to the output shaft in a rotationally fixed manner and the third element of the third planetary gear set is permanently connected to the second element of the second planetary gear set in a rotationally fixed manner.

In this example variant, the output shaft is therefore permanently rotationally fixed to the second element of the third planetary gear set, whereas the third element of the third planetary gear set is permanently connected to the second element of the second planetary gear set in a rotationally fixed manner. In addition, an engagement of the first shift element results in a rotationally fixed connection between the first element of the third planetary gear set and a rotationally fixed component.

According to an alternative example design option of the invention, the first shift element is arranged and designed in such a way that, in the actuated condition, the first shift element connects the third element of the third planetary gear set with the second element of the second planetary gear set in a rotationally fixed manner, whereas the first element of the third planetary gear set is permanently fixed at the rotationally fixed component and the second element of the third planetary gear set is permanently connected with the output shaft in a rotationally fixed manner.

In this example coupling variant, a permanently rotationally fixed connection therefore exists between the first element of the third planetary gear set and the rotationally fixed component. In addition, the second element of the third planetary gear set and the output shaft are permanently connected to each other in a rotationally fixed manner. The first shift element, upon actuation, connects the third element of the third planetary gear set and the second element of the second planetary gear set to one another in a rotationally fixed manner.

In a further example coupling variant, the first shift element is arranged and designed in such a way that, in the actuated condition, the first shift element connects the second element of the third planetary gear set with the output shaft in a rotationally fixed manner, whereas the first element of the third planetary gear set is permanently fixed at the rotationally fixed component and the third element of the third planetary gear set is permanently connected with the second element of the second planetary gear set in a rotationally fixed manner.

In this example variant, a permanently rotationally fixed connection therefore exists between the first element of the third planetary gear set and the rotationally fixed component. In addition, the third element of the third planetary gear set and the second element of the second planetary gear set are permanently connected to each other in a rotationally fixed manner. The first shift element, upon actuation, connects the second element of the third planetary gear set and the rotationally fixed component to one another in a rotationally fixed manner.

According to one example embodiment of the invention, selective engagement of the six shift elements results in four gears between the first input shaft and the output shaft that differ in terms of ratio. A first gear can be implemented between the first input shaft and the output shaft by actuating the first shift element and the fifth shift element, in which travel takes place with the simultaneous integration of a prime mover joined at the first input shaft, and the electric machine. Moreover, a second gear results between the first input shaft and the output shaft by engaging the first shift element and the fourth shift element.

A third gear can be implemented between the first input shaft and the output shaft in a first example variant by engaging the second shift element and the sixth shift element. In addition, the third gear can also be implemented, in a second example variant, by actuating the second shift element and the sixth element, in a third example variant by engaging the fourth shift element and the sixth shift element and, in a fourth example variant, by engaging the second shift element and the fourth shift element. In a fifth example variant, the third gear results by engaging the second shift element and the fifth shift element.

In addition, in a sixth example variant, the third gear can be implemented simply by engaging the second shift element, since the first input shaft and the output shaft are then directly connected to one another in a rotationally fixed manner in combination with a rotationally fixed connection of the output shaft with the second element of the first planetary gear set, and so travel can take place via the upstream prime mover. The electric machine can also be decoupled, since, in this case, only the second shift element is loaded with torque and, in addition, the second input shaft can remain idle. As a result, zero-load losses of the electric machine can be avoided. However, a shift into the aforementioned example variants of the third gear has the advantage that the electric machine is also integrated and, as a result, hybrid driving can take place.

In addition, a fourth gear can be implemented between the first input shaft and the output shaft in a first example variant by actuating the first shift element and the third shift element, wherein the fourth gear can also be implemented, in a second example variant, by engaging the third shift element and the sixth shift element, in a third example variant by actuating the third shift element and the fourth shift element and, in a fourth example variant, by engaging the third shift element and the fifth shift element.

In addition, in a fifth example variant, the fourth gear can take place simply by engaging the third shift element via the upstream prime mover, since, when the third shift element is engaged, the first input shaft and the output shaft are directly connected to each other in a rotationally fixed manner in combination with a rotationally fixed connection of the output shaft with the third element of the first planetary gear set. The electric machine can also be decoupled in this case, since, when the third shift element is engaged, only the third shift element is loaded with torque and the second input shaft can remain idle. Consequently, zero-load losses of the electric machine can be avoided in the fourth gear. An implementation of five aforementioned example variants of the fourth gear has the advantage, however, that hybrid driving can take place due to the simultaneous integration of the upstream prime mover and the electric machine.

Finally, an additional gear results by actuating the fifth shift element and the sixth shift element.

Given a suitable selection of stationary transmission ratios of the planetary gear sets, a transmission ratio range which is suitable for the application in a motor vehicle is implemented as a result. In this case, gear shifts between the gears can be implemented, in which only the condition of two shift elements, in each case, is always to be varied, in that one of the shift elements contributing to the preceding gear is to be disengaged and another shift element is to be engaged in order to implement the subsequent gear. As a further consequence thereof, a shift between the gears can take place very rapidly.

Due to the connection of the electric machine to the second input shaft of the transmission, different operating modes can also be achieved in a simple way.

A first gear between the second input shaft and the output shaft can be utilized for purely electric driving, wherein this first gear results by engaging the first shift element.

By engaging the first shift element, the electric machine is connected to the drive output with a constant ratio (the third element with respect to the second element in each case with a fixed first element of the second planetary gear set and the third planetary gear set), i.e., travel then takes place purely electrically with a ratio that corresponds to the first internal combustion engine-driven gear.

In addition, a second gear can also be implemented between the second input shaft and the output shaft for purely electric driving. The sixth shift element is to be actuated in order to engage this second gear. By engaging the sixth shift element, the electric machine is connected to the drive output with a constant ratio (the third element transmits onto the second element with the first element of the second planetary gear set fixed), i.e., travel then takes place purely electrically with a ratio that corresponds to the additional gear.

Starting from purely electric driving in the first gear, which is effective between the second input shaft and the output shaft, the upstream prime mover can then be started into the first gear, which is effective between the first input shaft and the output shaft, into the second gear, which is effective between the first input shaft and the output shaft, into the first example variant of the third gear, which is effective between the first input shaft and the output shaft, and into the first example variant of the fourth gear, which is effective between the first input shaft and the output shaft, since the first shift element contributes to each of these.

In addition, a start of the upstream prime mover can also take place from the second gear, which is effective between the second input shaft and the output shaft, into the second example variant of the third gear, into the third example variant of the third gear, and into the second example variant of the fourth gear, which is effective between the first input shaft and the output shaft, or into the additional gear.

As a further operating mode, a charging operation of an electrical energy accumulator can also be implemented, in that only the fourth shift element is engaged and, thereby, a rotationally fixed connection between the first input shaft and the second input shaft and, thereby, also a coupling with the electric machine are established. In this condition, the second input shaft rotates, in particular, faster than the first input shaft. At the same time, a force-fit connection to the output shaft is not established, and therefore the transmission is in a neutral position. Apart from a charging operation, a start of the upstream prime mover via the electric machine can also be implemented as a result.

Alternatively, the fifth shift element can also be engaged, in order to implement a charging operation, i.e., in order to connect the electric machine directly with the internal combustion engine. In this condition, the first input shaft and the second input shaft preferably rotate at the same speed.

Moreover, powershifts with tractive force support can be implemented. During the gearchange between the first gear and the second gear, the tractive force with the first shift element engaged can be supported via the electric machine, wherein the synchronization of the shift element to be engaged takes place via a closed-loop control of the rotational speed of the upstream prime mover. Alternatively, however, this can also take place by using synchronized shift elements or also by using another, separate synchronizing mechanism, such as a transmission brake or also one further electric machine, which can be operatively connected directly or indirectly to the first input shaft. If one further shift element, as a separating clutch, is also provided on the input side of the input shaft, the inertial mass of the upstream drive machine can be decoupled during the synchronization.

A gearchange under load can also take place between the second gear and the first example variant of the third gear when the first shift element is engaged. This is also implementable, in addition, during a gearchange between the first example variant of the third gear and the first example variant of the fourth gear, which is effective between the first input shaft and the output shaft, since the first shift element contributes to both example variants in this case as well.

The transmission according to example aspects of the invention can also be operated in such a way that a rotational-speed reduction of the electric machine is achieved during driving. It is therefore possible to initially drive in a hybrid manner in the first example variant of the fourth gear, in that the first shift element initially remains engaged either after a gear shift from the third gear into the fourth gear with torque assistance from the electric machine or after a start of the prime mover into the fourth gear. In order to now reduce a rotational speed of the electric machine in the fourth gear at higher ground speeds, however, a change-over can be carried out from the first example variant of the fourth gear into the second example variant of the fourth gear, since the rotor of the electric machine has a lower rotational speed in the second example variant of the fourth gear than in the first example variant of the fourth gear. This change-over takes place while obtaining the tractive force via the upstream prime mover, with the third shift element engaged. Initially, the load-free, first shift element is disengaged and, subsequent thereto, the load-free, sixth shift element is engaged, wherein the rotational-speed adaptation takes place via closed-loop control of the rotational speed of the electric machine.

A separate shift element is not necessary for decoupling the upstream prime mover, since, in the second example variant of the fourth gear, which is effective between the first input shaft and the output shaft, the upstream prime mover can be decoupled by disengaging the third shift element. As a result, the second gear is then implemented, which is effective between the second input shaft and the output shaft. In addition, in the case of a vehicle that is slowing down, a downshift from the fourth gear, which is effective between the first input shaft and the output shaft, into the third gear, which is effective between the first input shaft and the output shaft, can be prepared, in that, initially, a change-over takes place from the second example variant into the first example variant of the fourth gear and, in the process, the tractive force is obtained via the upstream prime mover, with the third shift element engaged. In the first example variant of the fourth gear, the first shift element is engaged, which becomes necessary in order to support the tractive force via the electric machine as part of the downshift from the fourth gear into the third gear.

Alternatively, a downshift from the fourth gear, which is effective between the first input shaft and the output shaft, into the third gear, which is effective between the first input shaft and the output shaft, can also be implemented with the sixth shift element engaged, however, in that a change-over takes place between the second example variant of the fourth gear and the second example variant of the third gear, to the implementation of which the sixth shift element contributes, in each case. The electric machine then supports the tractive force. Thereafter, the sixth shift element can be disengaged, if necessary, and, subsequently, the first shift element can be engaged, wherein a synchronization takes place via the electric machine and a support of the tractive force takes place via the upstream prime mover. As a result, the rotational speed of the electric machine can also be varied in the third gear, which is effective between the first input shaft and the output shaft.

As one further example design option of the invention, a further electric machine is provided, the rotor of which is connected at the first input shaft. Such an example embodiment has the advantage that further driving modes can be achieved as a result. In addition, as a result, a start of the upstream prime mover can be implemented immediately, if necessary, if the prime mover is designed as an internal combustion engine. In addition, the additional electric machine can support the upstream prime mover in the synchronization of shift elements.

According to one further example embodiment of the invention, the first input shaft can be connected in a rotationally fixed manner, via an eighth shift element, to a connection shaft, which, in turn, is then preferably coupled within a motor vehicle drive train to the prime mover connected upstream from the transmission. The eighth shift element can be designed, in principle, as a force-locking or also as a form-locking shift element in this case, although it is particularly preferred when the eighth shift element is present as a dog clutch. Via the eighth shift element, the upstream prime mover can therefore also be completely decoupled from the transmission, so that a purely electric operation is implementable in a problem-free manner.

In one example refinement of the invention, one or multiple shift element(s) is/are each implemented as a form-locking shift element. In this case, the particular shift element is preferably designed either as a constant-mesh shift element or as a lock-synchronizer mechanism. Form-locking shift elements have the advantage over friction-locking shift elements that lower drag losses occur in the disengaged condition, and therefore a better efficiency of the transmission can be achieved. In particular, in the transmission according to example aspects of the invention, all shift elements are implemented as form-locking shift elements, and therefore the lowest possible drag losses can be achieved. It is preferred when the seventh shift element, which is provided if necessary, is also designed as a force-locking shift element. In principle, however, one shift element or multiple shift elements could also be configured as force-locking shift elements, for example, as lamellar shift elements.

The planetary gear sets are preferably arranged in the axial direction starting from a transmission input in the sequence first planetary gear set, second planetary gear set, third planetary gear set. Alternatively, the planetary gear sets can also be arranged in the axial direction starting from a transmission input in the sequence second planetary gear set, third planetary gear set, first planetary gear set.

Within the scope of example aspects of the invention, the planetary gear sets can each be present as a minus or negative planetary gear set, provided it allows for a connection of the elements, wherein the first element of the particular planetary gear set is a sun gear, the second element of the particular planetary gear set is a planet carrier, and the third element of the particular planetary gear set is a ring gear. A minus planetary gear set is composed, in a way known, in principle, to a person skilled in the art, of the elements sun gear, planet carrier, and ring gear, wherein the planet carrier, rotatably mounted, guides at least one planet gear, although preferably multiple planet gears, which each individually mesh with the sun gear and with the surrounding ring gear.

Alternatively thereto, one planetary gear set or also multiple planetary gear sets could also be present as a plus or positive planetary gear set, however, provided it allows for the connection of the particular elements, wherein the first element of the particular planetary gear set is then a sun gear, the second element of the particular planetary gear set is a ring gear, and the third element of the particular planetary gear set is a planet carrier. In a plus planetary gear set as well, the elements sun gear, ring gear, and planet carrier are present, wherein the planet carrier guides at least one planet gear pair, in which one planet gear is meshed with the internal sun gear and the other planet gear is meshed with the surrounding ring gear, and the planet gears are intermeshed with each other.

Where permitted by a connection of the individual elements, a minus planetary gear set can be converted into a plus planetary gear set, wherein, as compared to the design as a minus planetary gear set, the ring gear connection and the planet carrier connection are to be interchanged, and a stationary transmission ratio is to be increased by one. Conversely, a plus planetary gear set could also be replaced by a minus planetary gear set, provided the connection of the elements of the transmission enables this. In this case, as compared to the plus planetary gear set, the ring gear connection and the planet carrier connection would also need to be interchanged, and a stationary transmission ratio would need to be reduced by one. Within the scope of example aspects of the invention, the three planetary gear sets are each preferably designed as a minus planetary gear set, however.

In the present case, each planetary gear set can be designed as a minus planetary gear set or as a plus planetary gear set, since a direct drive is not present at the second element of the second planetary gear set.

Each of the planetary gear sets is preferably present as a minus planetary gear set, wherein the first element of the particular planetary gear set is a sun gear, the second element of the particular planetary gear set is a planet carrier, and the third element of the particular planetary gear set is a ring gear. A minus planetary gear set is composed, in a way known, in principle, to a person skilled in the art, of the elements sun gear, planet carrier, and ring gear, wherein the planet carrier, rotatably mounted, guides at least one planet gear, although preferably multiple planet gears, which each individually mesh with the sun gear and with the surrounding ring gear, i.e., are in meshing engagement therewith.

According to one further example embodiment of the invention, the first shift element and the sixth shift element are combined to form a shift element pair, with which one actuating element is associated. The first shift element, on the one hand, and the sixth shift element, on the other hand, can be actuated via the actuating element starting from a neutral position. This has the advantage that, due to this combination, the number of actuating elements can be reduced and, thereby, the manufacturing complexity can also be reduced.

Alternatively or also in addition to the aforementioned example variants, the second shift element and the third shift element are combined to form a shift element pair, with which one actuating element is associated. The second shift element, on the one hand, and the third shift element, on the other hand, can be actuated from a neutral position via this actuating element. As a result, the manufacturing complexity can be reduced, in that, due to the combination of the two shift elements to form a shift element pair, one actuating unit can be utilized for both shift elements. Alternatively, the second shift element and the fourth shift element or the second shift element and the fifth shift element can also be combined, however.

In addition, alternatively or also in addition to the two aforementioned example variants, the fourth shift element and the fifth shift element are combined to form a shift element pair, with which one actuating element is associated. The fourth shift element, on the one hand, and the fifth shift element, on the other hand, can be actuated via this actuating element starting from a neutral position. As a result of this as well, the manufacturing complexity can be reduced, since an actuation of the two shift elements can therefore take place via one common actuating unit. Alternatively, the third shift element and the fifth shift element or the third shift element and the fourth shift element can also be combined, however.

It is particularly preferred when three aforementioned shift element pairs are implemented simultaneously, and so the six shift elements of the transmission can be actuated via three actuating elements. As a result, a particularly low manufacturing complexity can be achieved.

According to one example embodiment of the invention, the rotor of the electric machine is rotationally fixed to the second input shaft. Alternatively, according to one example design option of the invention, the rotor is connected to the second input shaft via at least one gear stage. The electric machine can be arranged either coaxially to the planetary gear sets or so as to be situated axially offset with respect thereto. In the former case, the rotor of the electric machine can either be rotationally fixed directly to the second input shaft or can be coupled thereto via one or also multiple intermediate gear stage(s), wherein the latter allows for a more favorable configuration of the electric machine with higher rotational speeds and lower torques. The at least one gear stage can be designed as a spur gear stage and/or as a planetary gear stage in this case. In the case of a coaxial arrangement of the electric machine, one or more of the planetary gear set(s) can then also, more preferably, be arranged axially in the area of the electric machine as well as radially internally with respect thereto, so that the axial installation length of the transmission can be shortened.

If the electric machine is provided axially offset with respect to the planetary gear sets, however, a coupling takes place via one or multiple intermediate gear stage(s) and/or a flexible traction drive mechanism. The one or the multiple gear stage(s) can also be implemented individually, in this case, either as a spur gear stage or as a planetary gear stage. A flexible traction drive mechanism can be either a belt drive or a chain drive.

If a further electric machine is also provided, a rotor of this further electric machine can also be either rotationally fixed to the first input shaft directly or can be coupled to the first input shaft via at least one gear stage. The at least one gear stage can be a spur gear stage or a planetary gear stage or also a flexible traction drive mechanism. In addition, the further electric machine can be provided coaxially or also axially offset with respect to the first input shaft and, thereby, also to the planetary gear sets.

Within the scope of example aspects of the invention, a starting component can be installed upstream from the transmission, for example a hydrodynamic torque converter or a friction clutch. This starting component can then also be an integral part of the transmission and acts to configure a starting process, in that the starting component enables a slip speed between the prime mover, which is designed, in particular, as an internal combustion engine, and the first input shaft of the transmission. In this case, one of the shift elements of the transmission or the separating clutch, which may be present, can also be designed as such a starting component, in that the one of the shift elements is present as a frictional shift element. In addition, a one-way clutch with respect to the transmission housing or to another shaft can be arranged on each shaft of the transmission, in principle.

The transmission according to example aspects of the invention is, in particular, part of a motor vehicle drive train for a hybrid or electric vehicle and is then arranged between a prime mover of the motor vehicle, which is configured as an internal combustion engine or as an electric machine, and further components of the drive train, which are arranged downstream in the direction of power flow to driving wheels of the motor vehicle. In this case, the first input shaft of the transmission is either permanently coupled to a crankshaft of the internal combustion engine or to the rotor shaft of the electric machine in a rotationally fixed manner or is connectable thereto via an intermediate separating clutch or a starting component, wherein a torsional vibration damper can also be provided between an internal combustion engine and the transmission. On the output end, the transmission is then preferably coupled, within the motor vehicle drive train, to a differential gear of a drive axle of the motor vehicle, wherein a connection to an interaxle differential can also be present in this case, however, via which a distribution to multiple driven axles of the motor vehicle takes place. The differential gear or the interaxle differential can be arranged with the transmission in one common housing in this case. A torsional vibration damper, which is optionally present, can also be integrated into this housing.

Within the meaning of the invention, the expressions that two components of the transmission are "connected" or "coupled" or "are connected to each other" mean a permanent coupling of these components, and therefore said components cannot rotate independently of each other. In that respect, no shift element is provided between these components, which can be elements of the planetary gear sets and/or also shafts and/or a rotationally fixed component of the transmission. Instead, the appropriate components are coupled to each other with a consistent rotational speed dependence.

However, if a shift element is provided between two components, these components are not permanently coupled to each other. Instead, a coupling is carried out only by actuating the intermediate shift element. In this case, an actuation of the shift element means, within the meaning of the invention, that the particular shift element is transferred into an engaged condition and, consequently, synchronizes the turning motions, if necessary, of the components connected directly thereto. In the case of an example embodiment of the particular shift element as a form-locking shift element, the components directly connected to each other in a rotationally fixed manner via the shift element rotate at the same rotational speed, while, in the case of a force-locking shift element, speed differences can exist between the components also after an actuation of the same shift element. This intentional or also unintentional condition is nevertheless referred to, within the scope of the invention, as a rotationally fixed connection of the particular components via the shift element.

The invention is not limited to the specified combination of features of the main claim or the claims dependent thereon. In addition, individual features can be combined with one another, provided they arise from the claims, the description of preferred embodiments of the invention which follows, or directly from the drawings. References in the claims to the drawings via the use of reference signs is not intended to limit the scope of protection of the claims.

BRIEF DESCRIPTION OF THE DRAWINGS

Advantageous embodiments of the invention, which are explained in the following, are represented in the drawings, in which:

FIG. 11 shows an exemplary shift pattern of the transmissions from FIGS. 2 to 10;

FIG. 15 shows an exemplary shift pattern of the motor vehicle drive train from FIG. 1 with a transmission according to FIGS. 12 and 14; and FIGS. 16 through 21 each show a schematic of a modification of the transmissions from FIGS. 2 through 10 as well as 12 through 14.

DETAILED DESCRIPTION

Figure 1:
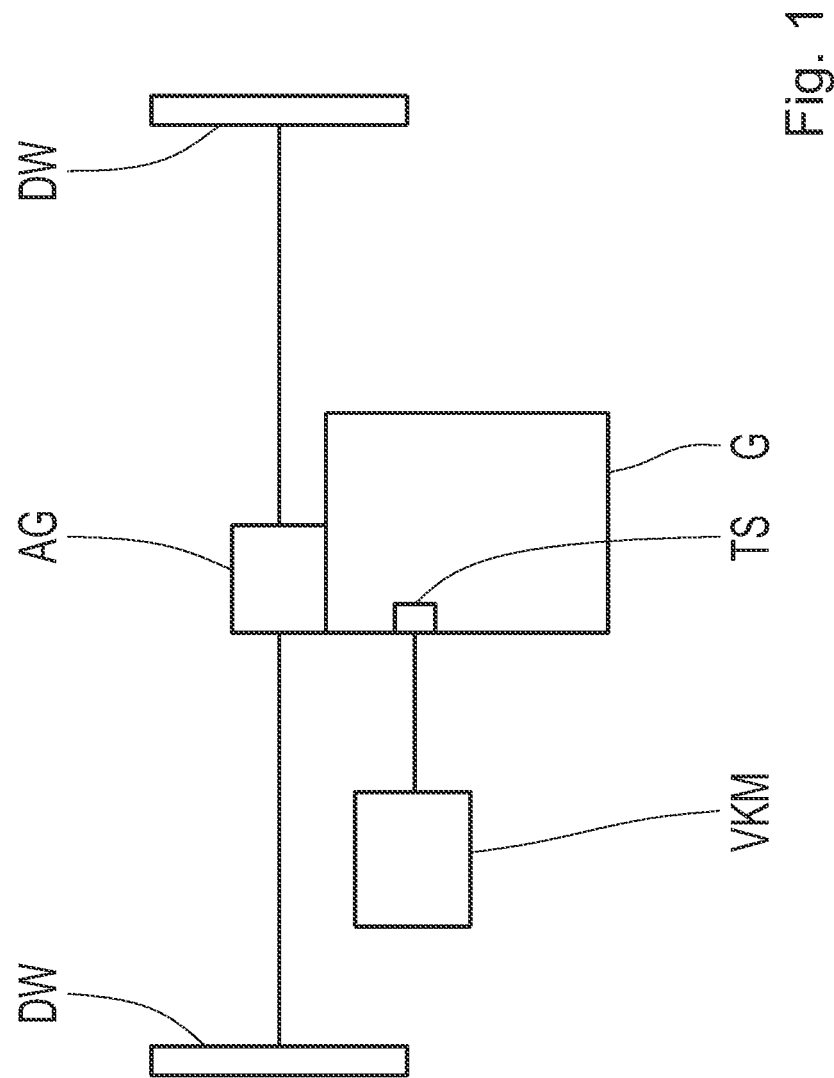
FIG. 1 shows a diagrammatic view of a motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagrammatic view of a motor vehicle drive train of a hybrid vehicle, wherein, in the motor vehicle drive train, an internal combustion engine VKM is connected to a transmission G via an intermediate torsional vibration damper TS. Connected downstream from the transmission G, on the output end thereof, is a differential gear AG, via which drive power is distributed to driving wheels DW of a drive axle of the motor vehicle. The transmission G and the torsional vibration damper TS are arranged in a common housing of the transmission G in this case, into which the differential gear AG can then also be integrated. As is also apparent in FIG. 1, the internal combustion engine VKM, the torsional vibration damper TS, the transmission G, and also the differential gear AG are aligned transversely to a direction of travel of the motor vehicle.

Figure 2:
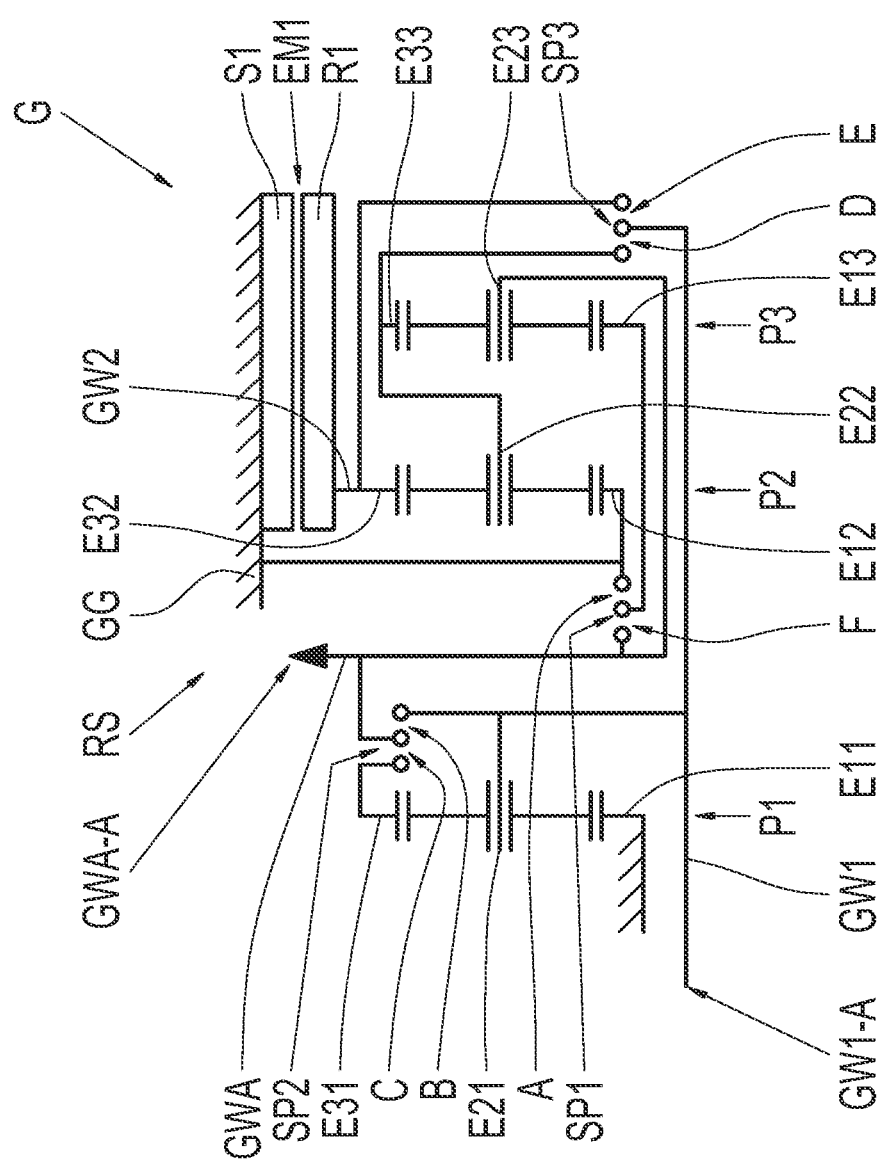
FIGS. 2 through 10 each show a diagrammatic view of a transmission of the type that can be utilized in the motor vehicle drive train from FIG. 1.

FIG. 2 shows a schematic of the transmission G according to a first example embodiment of the invention. As is apparent, the transmission G includes a gear set RS and an electric machine EM1, which are both arranged in the housing of the transmission G. The gear set RS includes three planetary gear sets P1, P2, and P3, wherein each of the planetary gear sets P1, P2, and P3 includes a first element E11 and E12 and E13, respectively, a second element E21 and E22 and E23, respectively, and a third element E31 and E32 and E33, respectively. The first element E11 and E12 and E13 is formed by a sun gear of the planetary gear set P1 and P2 and P3, respectively, while the second element E21 and E22 and E23 of the planetary gear set P1 and P2 and P3, respectively, is present as a planet carrier, and the third element E31 and E32 and E33 of the planetary gear set P1 and P2 and P3, respectively, is present as a ring gear.

In the present case, the first planetary gear set P1, the second planetary gear set P2, and the third planetary gear set P3 are each therefore present as a minus planetary gear set. The particular planet carrier thereof guides at least one planet gear in a rotatably mounted manner; the planet gear is meshed with the particular radially internal sun gear as well as with the particular radially surrounding ring gear. It is particularly preferred, however, when multiple planet gears are provided in the first planetary gear set P1, in the second planetary gear set P2, and also in the third planetary gear set P3.

As is apparent in FIG. 2, the transmission G includes a total of six shift elements in the form of a first shift element A, a second shift element B, a third shift element C, a fourth shift element D, a fifth shift element E, and a sixth shift element F. These shift elements are each designed as form-locking shift elements and are preferably present as constant-mesh shift elements. While the first shift element A is designed as a brake, the remaining shift elements B, C, D, E, and F are present as clutches.

The first element E11 of the first planetary gear set P1 and the first element E12 of the second planetary gear set P2 are fixed at a rotationally fixed component GG and, thereby, permanently prevented from making a turning motion. The rotationally fixed component GG is, in particular, the transmission housing of the transmission G or a portion of the transmission housing. The second element E21 of the first planetary gear set P1 is permanently connected to a first input shaft GW1 in a rotationally fixed manner.

The second element E22 of the second planetary gear set P2 and the third element E33 of the third planetary gear set P3 are permanently connected to each other in a rotationally fixed manner. The second element E23 of the third planetary gear set P3 is connected to an output shaft GWA of the transmission G. The first element E13 of the third planetary gear set P3 can be fixed at the rotationally fixed component GG via the first shift element A.

As is also apparent in FIG. 2, the first input shaft GW1 of the transmission G can be connected with the second element E23 of the third planetary gear set P3 in a rotationally fixed manner via the second shift element B.

Apart therefrom, the third element E31 of the first planetary gear set P1 can be brought into a rotationally fixed connection with the output shaft by engaging the third shift element C.

The first input shaft GW1 can also be connected with the third element E33 of the third planetary gear set P3 in a rotationally fixed manner via the fourth shift element D and can be connected with the second input shaft GW2 in a rotationally fixed manner by the fifth shift element E. Moreover, the second element E23 of the third planetary gear set P3 can be connected with the output shaft GWA in a rotationally fixed manner by engaging the sixth shift element F. If the sixth shift element F is actuated, the third planetary gear set P3 is interlocked.

The first input shaft GW1 as well as the output shaft GWA form a mounting interface GW1-A and GWA-A, respectively, wherein the mounting interface GW1-A in the motor vehicle drive train from FIG. 1 is utilized for a connection at the internal combustion engine VKM, while the transmission G is connected at the mounting interface GWA-A to the downstream differential gear AG. The mounting interface GW1-A of the first input shaft GW1 is formed at an axial end of the transmission G, while the mounting interface GWA-A of the output shaft GWA is situated in the area of the same axial end and, here, is aligned transversely to the mounting interface GW1-A of the first input shaft GW1. In addition, the first input shaft GW1, the second input shaft GW2, and the output shaft GWA are arranged coaxially to one another.

The planetary gear sets P1, P2, and P3 are also situated coaxially to the input shafts GW1 and GW2 and the output shaft GWA, wherein the planetary gear sets P1, P2, and P3 are arranged in the sequence first planetary gear set P1, second planetary gear set P2, and third planetary gear set P3 axially subsequent to the mounting interface GW1-A of the first input shaft GW1. The electric machine EM1 is also located coaxially to the planetary gear sets P1, P2, and P3 and, thereby, also to the input shafts GW1 and GW2 and the output shaft GWA, wherein the electric machine EM1 is arranged axially at the level of the second planetary gear set P2 and of the third planetary gear set P3 and radially surrounding the second and third planetary gear sets P2, P3.

The sixth shift element F and the first shift element A are situated axially directly next to each other and radially at the same level and are combined to form a shift element pair SP1, in that a common actuating element is associated with the first shift element A and the sixth shift element F, via which the sixth shift element F, on the one hand, and the first shift element A, on the other hand, can be actuated from a neutral position.

The second shift element B and the third shift element C are also located axially between the first planetary gear set P1 and the second planetary gear set P2. The second shift element B and the third shift element C are provided axially directly next to each other and radially at the same level and include a common actuating element, via which the second shift element B, on the one hand, and the third shift element C, on the other hand, can be actuated from a neutral position. In that respect, the second shift element B and the third shift element C are combined to form a shift element pair SP2.

Finally, the fourth shift element D and the fifth shift element E are situated axially on a side of the third planetary gear set P3 facing away from the second planetary gear set P2. The fourth shift element D and the fifth shift element E are combined to form a shift element pair SP3, in that the fourth shift element D and the fifth shift element E are provided axially directly next to each other and radially essentially at the same level and include a common actuating element, via which the fourth shift element D, on the one hand, and the fifth shift element E, on the other hand, can be actuated from a neutral position.

Figure 3:
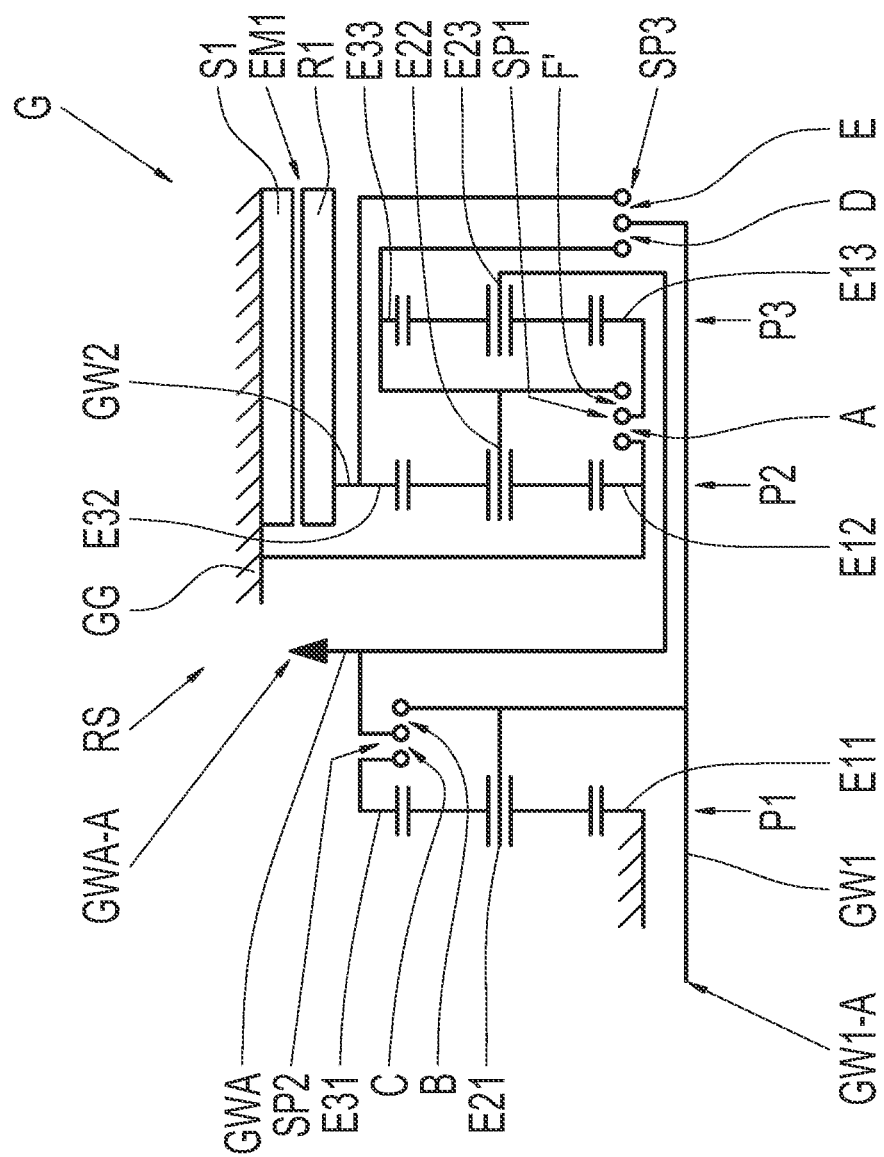

Moreover, FIG. 3 shows a diagrammatic view of a transmission G according to a second example design option of the invention, which can also be utilized in the motor vehicle drive train in FIG. 1. This example design option largely corresponds to the preceding example variant according to FIG. 2, with the difference that the sixth shift element now designated with F' (F prime), in the actuated condition, connects the first element E13 with the third element E33 of the third planetary gear set P3 in a rotationally fixed manner. Therefore, the example embodiment according to FIG. 3 is an interlock example variant. Otherwise, the example design option according to FIG. 3 corresponds to the example variant according to FIG. 2, and therefore reference is made to the description thereof.

Figure 4:
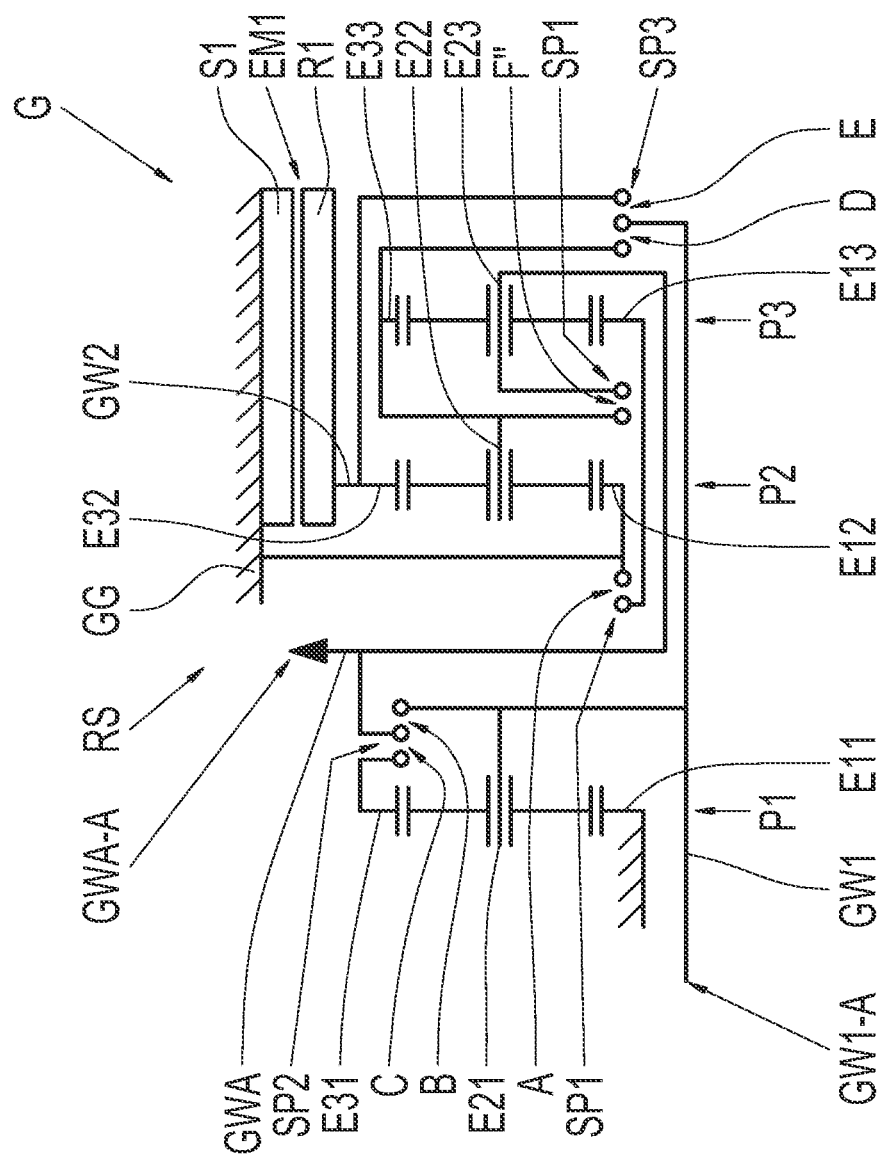

Moreover, FIG. 4 shows a diagrammatic view of a transmission G according to a second example design option of the invention, which can also be utilized in the motor vehicle drive train in FIG. 1. This example design option largely corresponds to the preceding example variant according to FIGS. 2 and/or 3, with the difference that the sixth shift element now designated with F" (F double prime), in the actuated condition, connects the first element E13 with the second element E23 of the third planetary gear set P3 in a rotationally fixed manner. Therefore, the example embodiment according to FIG. 4 is a second interlock example variant. Otherwise, the example design option according to FIG. 4 corresponds to the example variant according to FIGS. 2 and/or 3, and therefore reference is made to the description thereof.

Starting from the second interlock example variant (FIG. 4), two further example coupling variants are possible. This means, two further possible example arrangements of the first shift element A are conceivable. In the actuated condition, the first shift element A allows for a torque transmission by the third planetary gear set P3. However, if the first shift element A is disengaged, a torque transmission by the third planetary gear set P3 is not possible, since torque support cannot take place at the first element E13.

Figure 5:
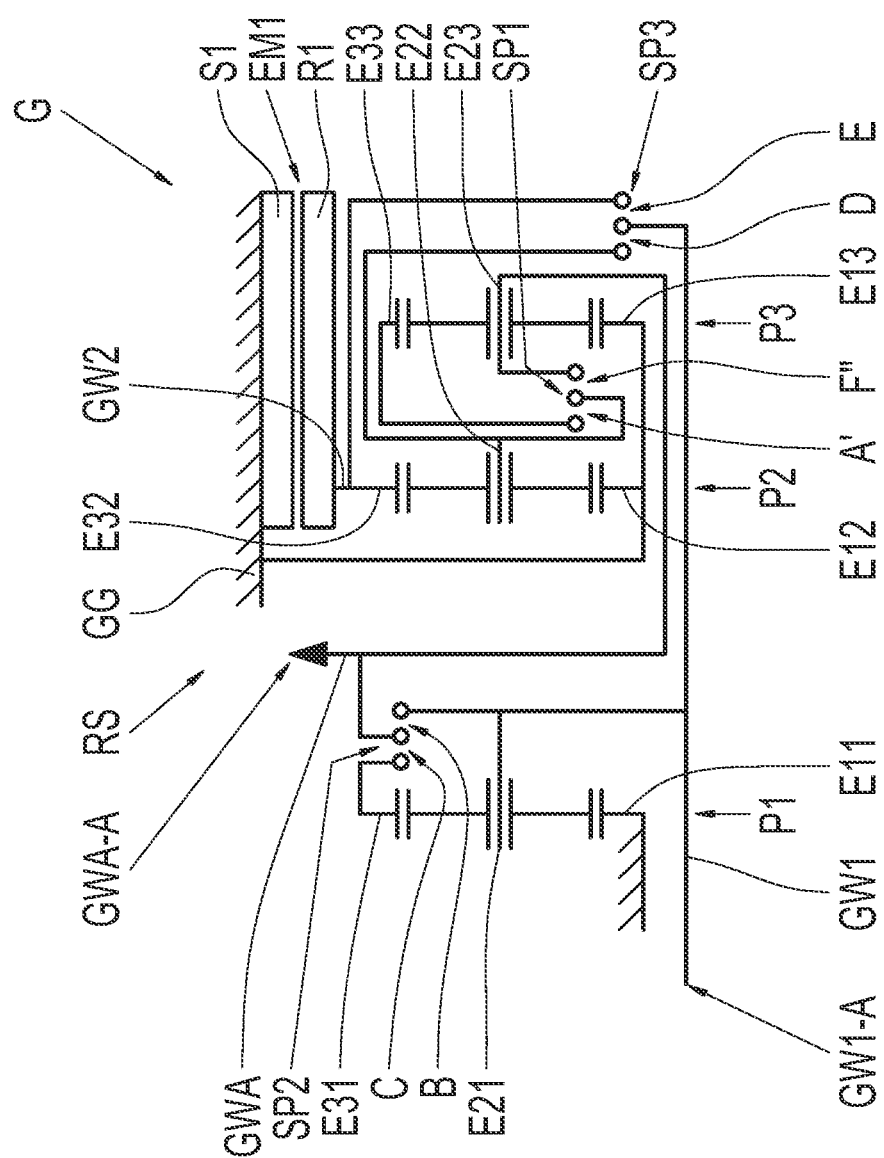

FIG. 5 shows a schematic of a transmission G according to a first example coupling variant of the invention, of the type which can also be utilized in the motor vehicle drive train from FIG. 1. In contrast to the example embodiment according to FIG. 4, the first shift element now designated as A' (A prime) is not positioned at the first element E13, but rather at the third element E33. This means, the formerly permanently fixed connection of the third element E33 with the second element E22 is replaced by a shiftable connection, and the formerly shiftable connection of the first element E13 to the rotationally fixed component GG is replaced by a fixed housing connection. If the first shift element A' (A prime) is actuated, torque can be supported via the fixed element E13. Otherwise, the example design option according to FIG. 5 corresponds to the example variant according to FIG. 4, and therefore reference is made to the description thereof.

Figure 6:
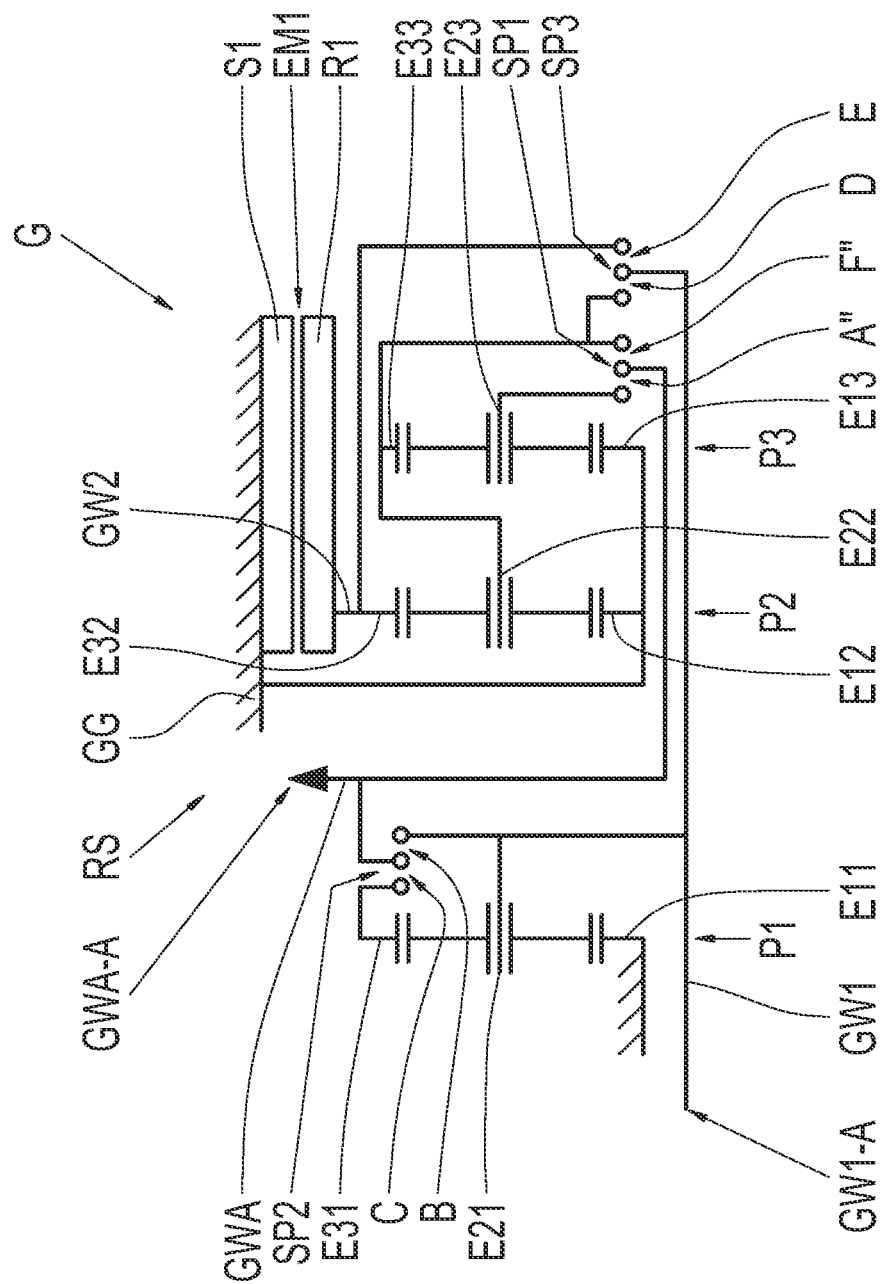

FIG. 6 shows a schematic of a transmission G according to a second example coupling variant of the invention, of the type which can also be utilized in the motor vehicle drive train from FIG. 1. In contrast to the example embodiment according to FIG. 4, the first shift element now designated as A" (A double prime) is not positioned at the first element E13, but rather at the second element E23. This means, the formerly permanently fixed connection of the second element E23 with the output shaft is replaced by a shiftable connection, and the formerly shiftable connection of the first element E13 to the rotationally fixed component GG is replaced by a fixed housing connection. If the first shift element A" (A double prime) is actuated, torque can be supported via the fixed element E13. Otherwise, the example design option according to FIG. 6 corresponds to the example variant according to FIG. 4, and therefore reference is made to the description thereof.

Figure 7:
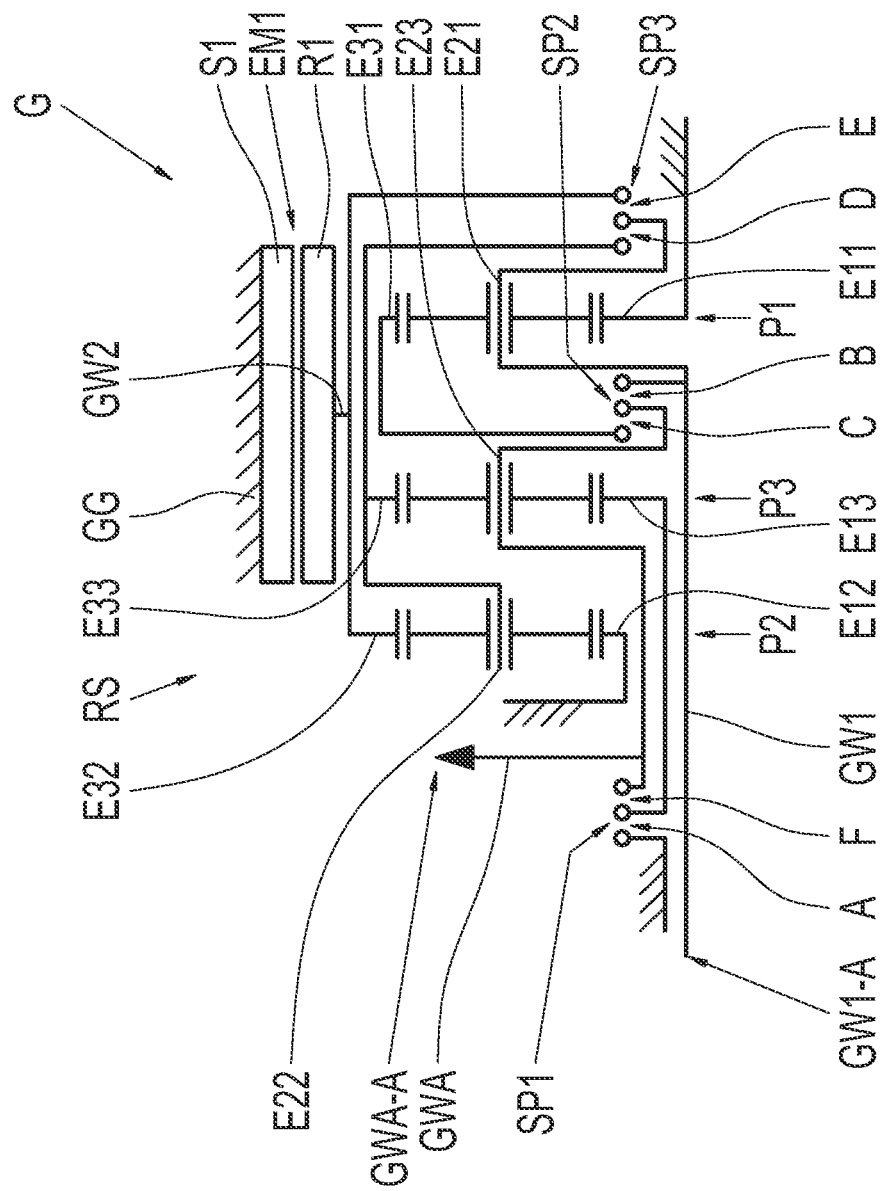
Figure 8:
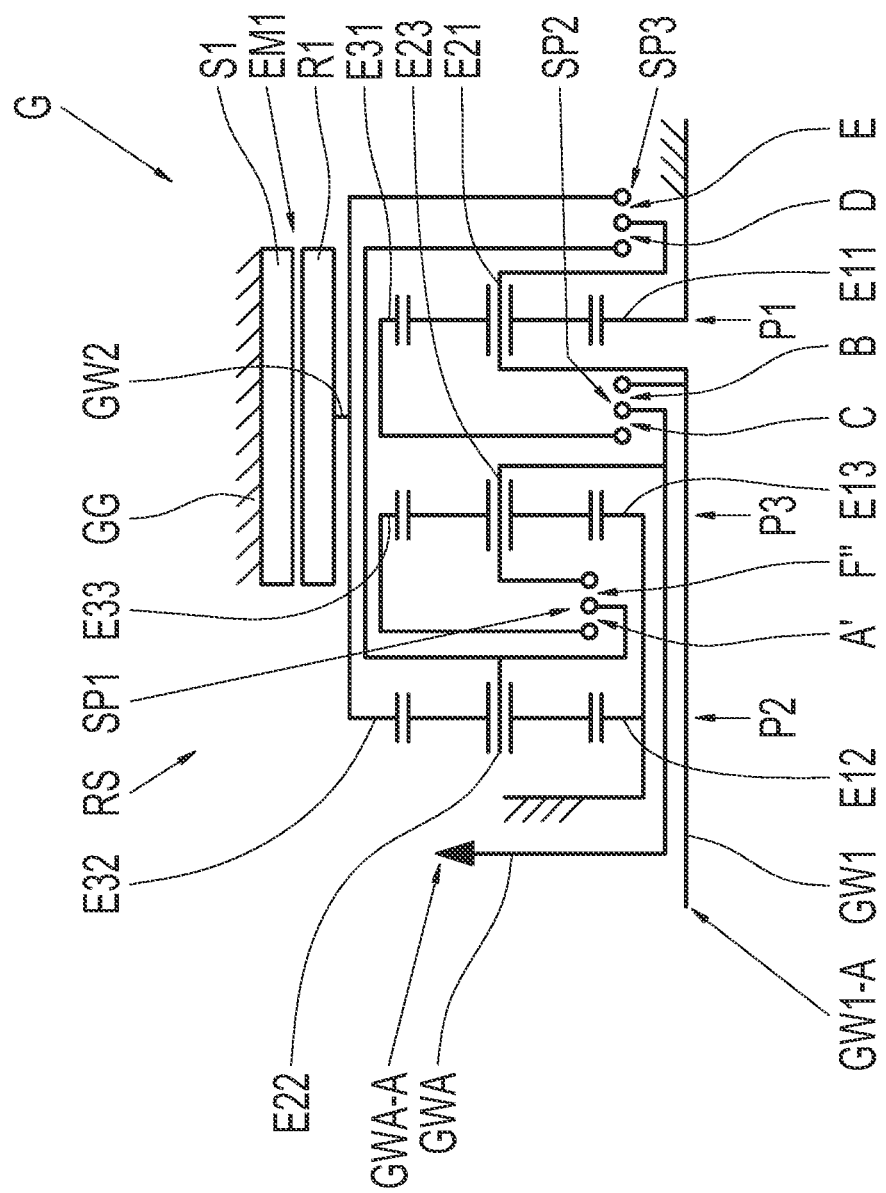
Figure 9:
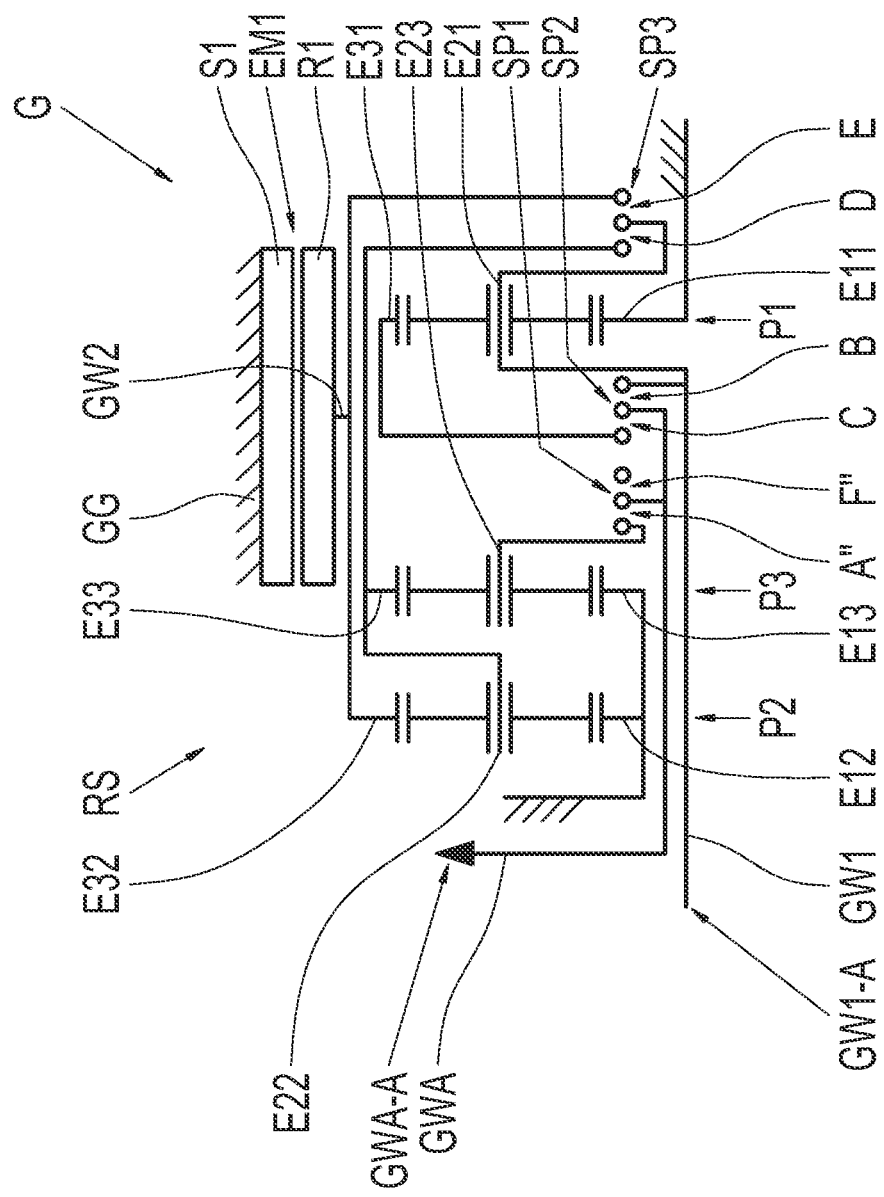

In addition to the previously represented axial sequence of the planetary gear sets P1-P2-P3, alternatively, the axial sequence P2-P3-P1, as shown in FIGS. 7 through 9, is also a possible and meaningful arrangement. All connections remain identical in this case. The above-described example interlock variants are also possible for this example arrangement.

The example embodiment according to FIG. 7, except for the arrangement of the planetary gear sets, corresponds to the example embodiment according to FIG. 2. The example embodiment according to FIG. 8, except for the arrangement of the planetary gear sets, corresponds to the example embodiment according to FIG. 5. However, the example embodiment according to FIG. 9, except for the arrangement of the planetary gear sets, essentially corresponds to the example embodiment according to FIG. 6.

Figure 10:
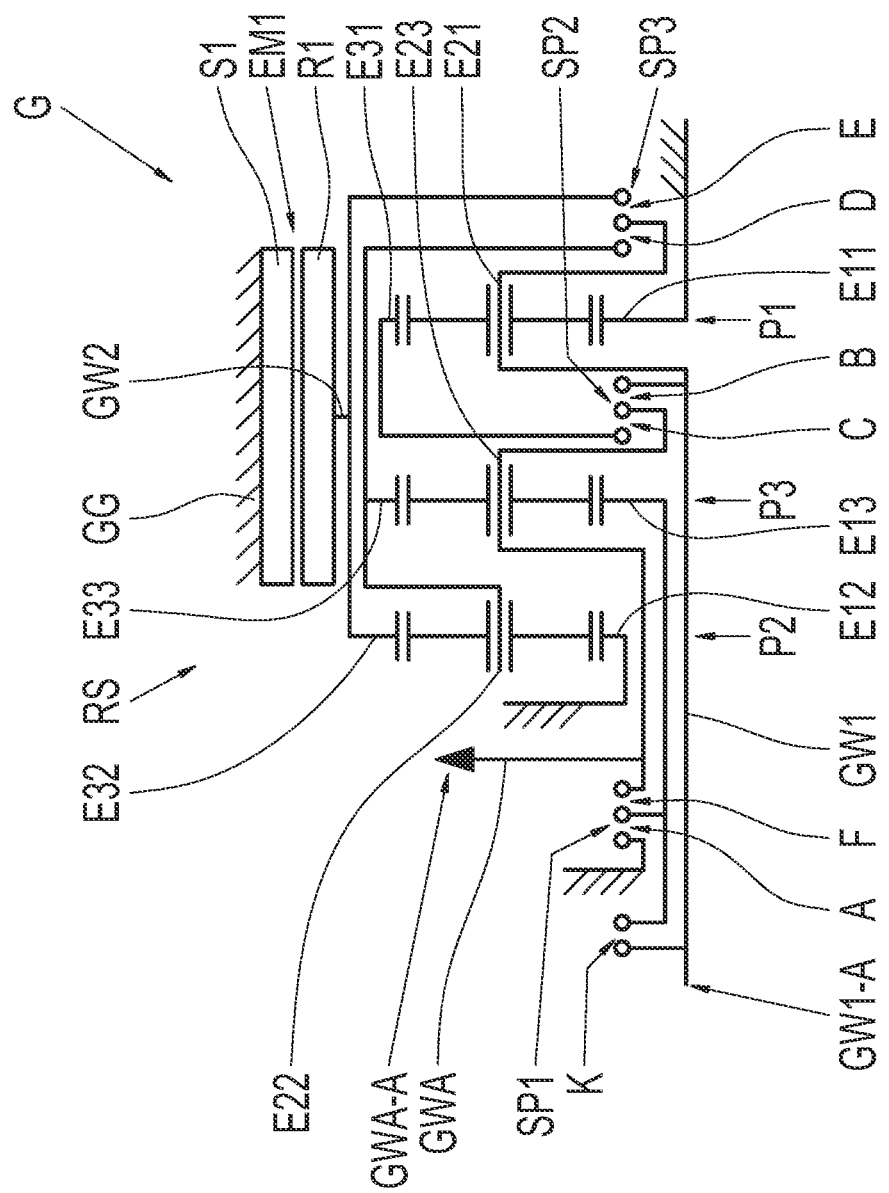

FIG. 10 shows a diagrammatic view of a transmission G according to a further example design option of the invention, which can also be utilized in the motor vehicle drive train from FIG. 1. This example design option largely corresponds to the preceding example variant according to FIG. 7, with the difference that an additional shift element K is provided. The seventh shift element (K) is arranged and designed in such a way that, in the actuated condition, the seventh shift element (K) connects the first input shaft (GW1) with the first element (E13) of the third planetary gear set (P3) in a rotationally fixed manner.

As a result, advantageously, electrodynamic forward travel can be implemented. Electrodynamic starting (EDA) means that a speed superimposition of the rotational speed of the internal combustion engine, the rotational speed of the electric machine, and the rotational speed of the output shaft takes place via one or multiple planetary gear set(s), and so it is possible to pull away from rest while the internal combustion engine is running. The electric machine supports a torque in this case. If the seventh shift element K is engaged, an EDA condition arises at the third planetary gear set P3. The internal combustion engine drives the first element E13 of the third planetary gear set P3, the electric machine EM1 supports the internal-combustion-engine torque via the constant ratio of the second planetary gear set P2 at the third element E33 of the third planetary gear set P3 and the second element E23 of the third planetary gear set P3 is connected with the output shaft GWA. In this way, an EDA starting operation forward is possible. Otherwise, the example design option according to FIG. 10 corresponds to the example variant according to FIG. 7, and therefore reference is made to the description thereof.

FIG. 11 shows an exemplary shift pattern for the transmissions G from FIGS. 2 through 10 in table form. As is apparent, a total of four gears 1 through 4, which differ in terms of the ratio, and one auxiliary gear HZG can be implemented between the first input shaft GW1 and the output shaft GWA, wherein, in the columns of the shift pattern, an X indicates which of the shift elements A through F is engaged in which of the gears 1 through 4 and in the auxiliary gear HZG.

As is apparent in FIG. 8, a first gear 1 is engaged between the first input shaft GW1 and the output shaft GWA by actuating the first shift element A and the fifth shift element E. Moreover, a second gear results between the first input shaft GW1 and the output shaft GWA by engaging the first shift element A and the fourth shift element D.

In addition, a third gear can be implemented between the first input shaft GW1 and the output shaft GWA in a first example variant 3.1 by actuating the first shift element A and the second shift element B, wherein the third gear can also be formed in a second example variant 3.2 by engaging the second shift element B and the sixth shift element F, in a third example variant 3.3 by actuating the fourth shift element D and the sixth shift element F, in a fourth example variant 3.4 by engaging the second shift element B and the fourth shift element D and, in a fifth example variant 3.5, by actuating the second shift element B and the fifth shift element E.

In a purely internal combustion engine-driven manner, the third gear can also be implemented simply by engaging the second shift element B (V3). In the latter example variant V3, the electric machine EM 1 is decoupled, and so travel can take place purely via the upstream internal combustion engine VKM. By comparison, in the example variants 1.1 through 3.5, travel takes place in a hybrid manner with simultaneous utilization of the internal combustion engine VKM and the electric machine EM 1.

In addition, a fourth gear results between the first input shaft GW1 and the output shaft GWA in a first example variant 4.1 by actuating the first shift element A and the third shift element C, wherein the fourth gear can also be implemented, in a second example variant 4.2, by engaging the third shift element C and the sixth shift element F, in a third example variant 4.3 by actuating the third shift element C and the fourth shift element D and, in a fourth example variant 4.4, by engaging the third shift element C and the fifth shift element E.

In a purely internal combustion engine-driven manner, the fourth gear can also be implemented V4 simply by engaging the third shift element C. In the latter example variant V4, the electric machine EM 1 is decoupled, and so travel can take place purely via the upstream internal combustion engine VKM. By comparison, in the example variants 4.1 through 4.4, travel takes place in a hybrid manner with simultaneous utilization of the internal combustion engine VKM and the electric machine EM 1. Finally the auxiliary gear HZG results by engaging the fifth shift element E and the sixth shift element F.

Although the shift elements A through F are each designed as form-fit shift elements, a power shift can be implemented between the first gear 1 and the second gear, between the second gear and the first example variant 3.1 of the third gear, and also between the first example variant 3.1 of the third gear and the first example variant 4.1 of the fourth gear. The reason therefor is that the first shift element A contributes to all these gears. A synchronization during the gear shifts can take place in each case via an appropriate closed-loop control of the upstream internal combustion engine VKM, and therefore the particular shift element to be disengaged is disengaged without load and the shift element to be subsequently engaged can be engaged without load.

The example transmissions G from FIGS. 2 through 10 can also be operated in alternative operating modes with the aid of the electric machine EM1: Purely electric driving can take place in a first gear E1, which is effective between the second input shaft GW2 and the output shaft GWA and, for the implementation of which, the first shift element A is to be transferred into an engaged condition. As a result, when the first shift element A is engaged, the electric machine EM1 in the case of the example transmissions G according to FIGS. 2 through 10 is coupled with the output shaft GWA via a constant ratio (the particular third element transmits onto the second element with the first element of P2 and P3 fixed). The ratio of the first gear E1 corresponds here, in each case, to a ratio of the first gear 1 between the first input shaft GW1 and the output shaft GWA.

In addition, a second gear E2 can also be implemented between the second input shaft GW2 and the output shaft GWA, for the implementation of which the sixth shift element F is to be engaged. As a result, the output shaft GWA in the example variants of the transmission G according to FIGS. 2 through 10 is coupled with the second input shaft GW2 and, thereby, also to the rotor R1 of the electric machine EM1 (the third element E32 transmits onto the second element E22 with the first element E12 of the second planetary gear set P2 fixed). A ratio of this second gear E2 corresponds to a ratio of the auxiliary gear HZG in each case.

Figure 12:
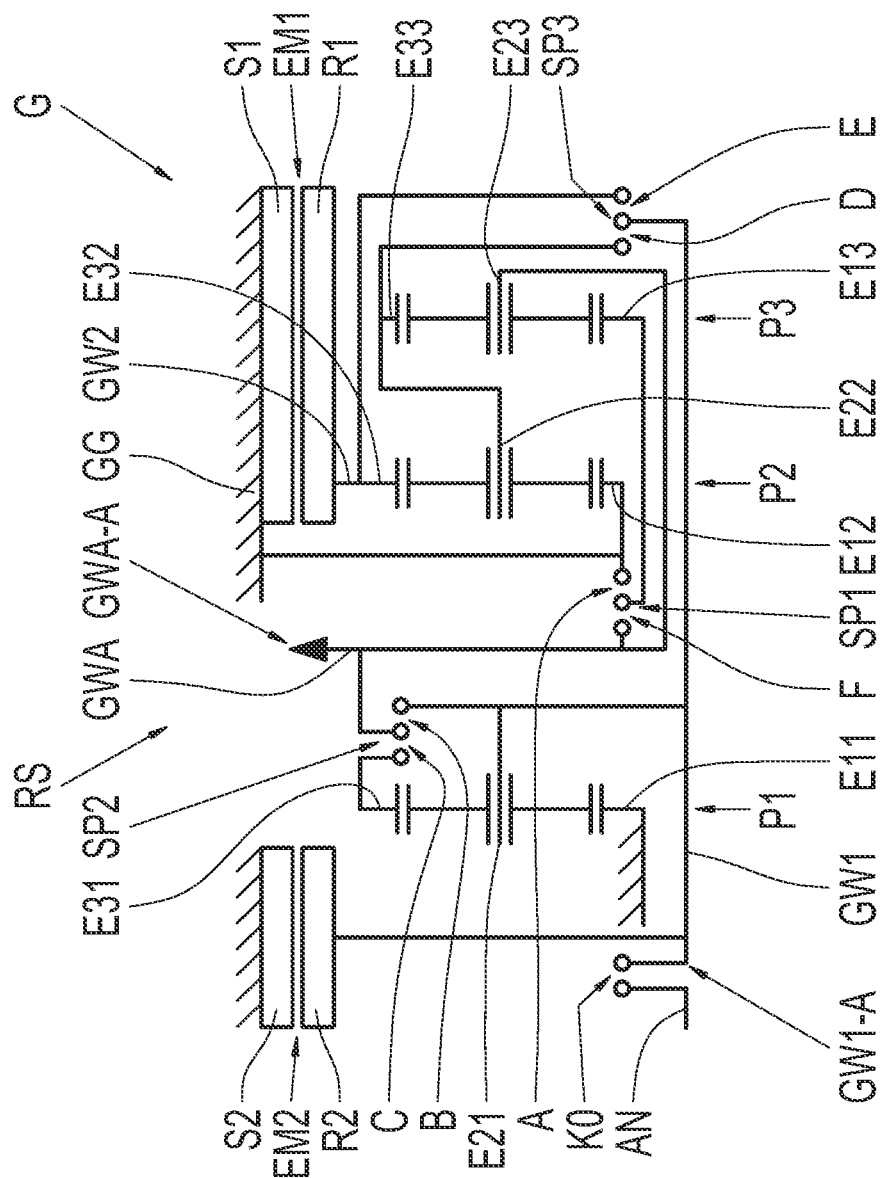
FIGS. 12 through 14 each show a diagrammatic view of a transmission of the type that can also be utilized in the motor vehicle drive train from FIG. 1.

Moreover, FIG. 12 shows a schematic of a transmission G according to a further example embodiment of the invention, of the type which can also be utilized in the motor vehicle drive train in FIG. 1. This example embodiment essentially corresponds to the example variant according to FIG. 2, wherein, in contrast thereto, the first input shaft GW1 can now be rotationally fixed, at the mounting interface GW1-A via an eighth shift element K0, to a connection shaft AN, which is then connected to the upstream internal combustion engine VKM in the motor vehicle drive train. The eighth shift element K0 is configured as a form-locking shift element and, particularly preferably, is present as a constant-mesh shift element. Moreover, a further electric machine EM2 is also provided, the rotor R2 of which is rotationally fixed to the first input shaft GW1, while a stator S2 of the further electric machine EM2 is fixed at the rotationally fixed component GG. For the rest, the example variant according to FIG. 12 corresponds to the example design option according to FIG. 2, and therefore reference is made to the description thereof.

Figure 13:
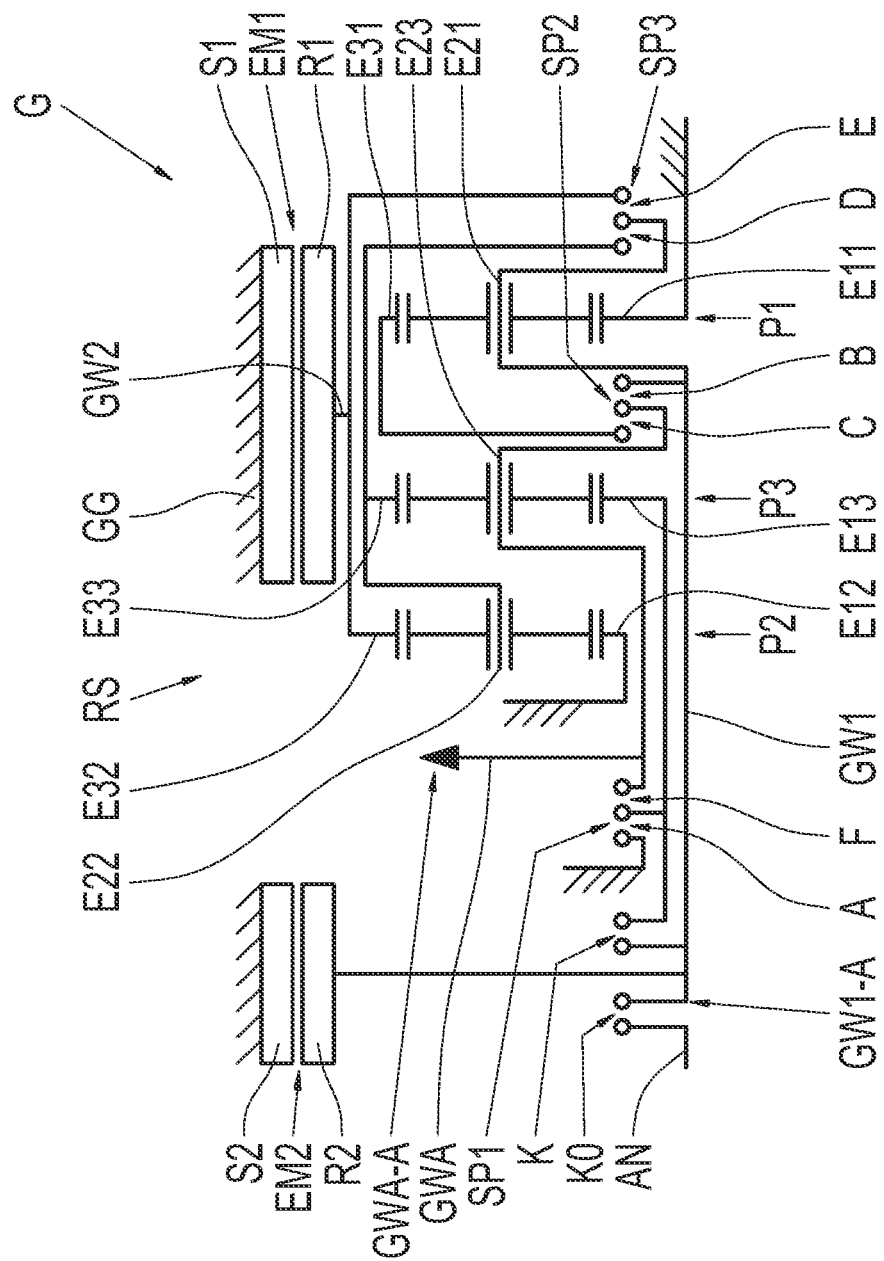

Moreover, FIG. 13 shows a schematic of a transmission G according to a further example embodiment of the invention, of the type which can also be utilized in the motor vehicle drive train in FIG. 1. This example embodiment largely corresponds to the example variant according to FIG. 10. As a supplement to the example embodiment according to FIG. 10, a second electric machine EM2 is provided, the rotor R2 of which is connected with the first input shaft GW1 in a rotationally fixed manner, while a stator S2 of the further electric machine EM2 is fixed at the rotationally fixed component GG. Here, the rotor R2 is connected at the first input shaft GW1 axially between the eighth shift element K0 and the seventh shift element K. For the rest, the example variant according to FIG. 13 corresponds to the example design option according to FIG. 10, and therefore reference is made to the description thereof.

Figure 14:
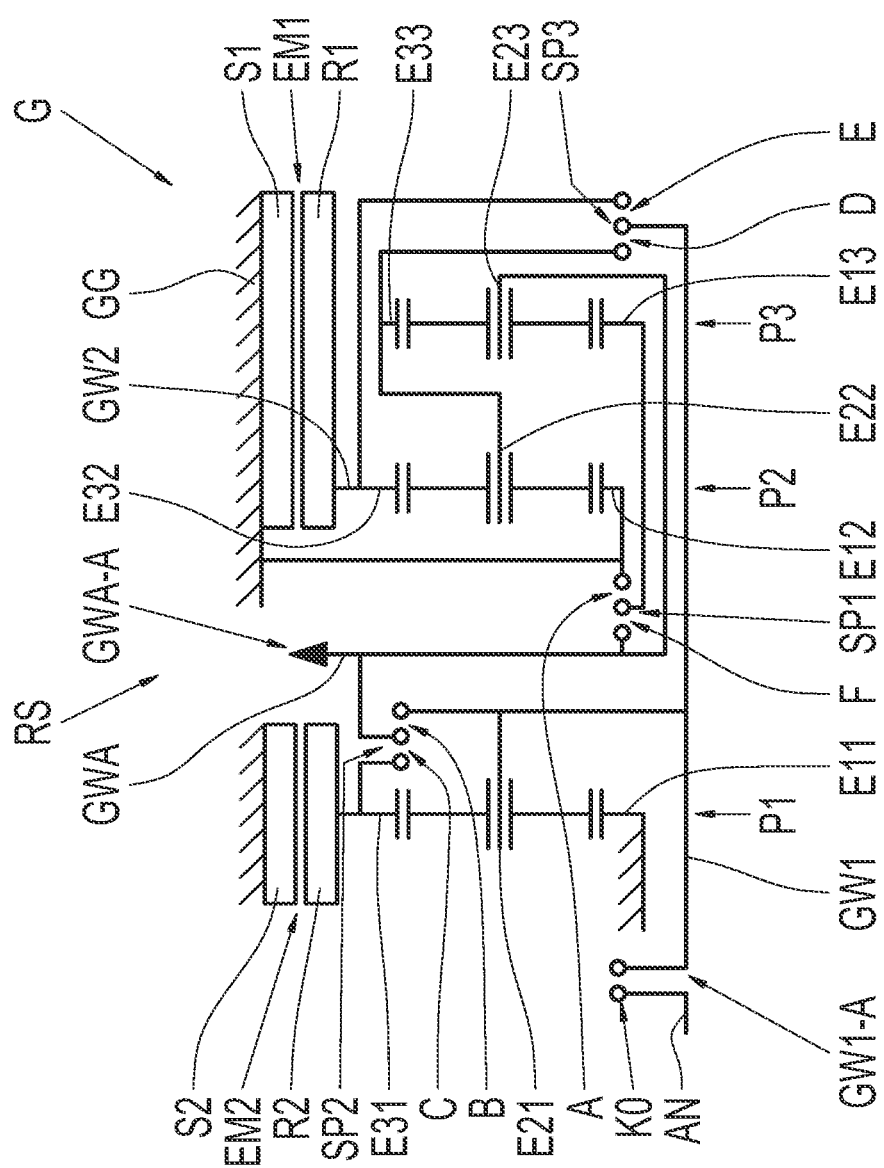

FIG. 14 shows a diagrammatic view of a transmission G according to a further example design option of the invention. This example design option can also be utilized in the motor vehicle drive train in FIG. 1.

In this example embodiment, the additional second electric machine EM2 is connected at the third element E31 of the first planetary gear set P1, and not at the input shaft GW1. As a result, the first planetary gear set P11 acts as a transmission-internal pre-ratio, i.e., the first electric machine rotates at a higher speed than the first input shaft GW1 and can therefore be designed with lower torque given the same power, which provides advantages in terms of installation space as well as costs. Such an arrangement of the second electric machine is possible only with the arrangement example variants with the planetary gear set sequence P1-P2-P3, however, since, here, the third element E13 is accessible from the housing GG. Otherwise, the example variant according to FIG. 14 corresponds to the example embodiment according to FIG. 2, and therefore reference is made to the description thereof.

In FIG. 15, different conditions of the motor vehicle drive train from FIG. 1, with utilization of the transmission G from FIGS. 12 through 14, are represented in table form, wherein these different conditions are achieved via different integrations of the two electric machines EM1 and EM2 and the internal combustion engine VKM.

Purely electric driving by means of a single electric machine and disengaged shift element K0. In the gear E1, purely electric driving takes place via the electric machine EM1, in that the first gear E1 is implemented in the transmission G in the way described above with respect to FIG. 11. In the gear E2, purely electric driving also takes place via the electric machine EM1, in that the second gear E2 is implemented in the transmission G in the way described above with respect to FIG. 11. In the gear E3, purely electric driving takes place via the electric machine EM2, in that the third gear E3 is implemented in the transmission G by actuating the second shift element B. In the gear E4, purely electric driving takes place via the electric machine EM2, in that the fourth gear E4 is implemented in the transmission G by actuating the third shift element C.

Purely electric driving by means of both electric machines and disengaged shift element K0. The same gear steps can be implemented as described in FIG. 11, wherein these can now be driven purely electrically.

The advantages of two electric machines can be summarized as follows:
  purely electric powershift, since the second electric machine EM2, with disengaged shift element K0, performs the functions of the internal combustion engine;
  the second electric machine, with disengaged shift element K0, can be utilized for synchronization, while the first electric machine EM1 supports the tractive force;
  a greater total electrical power is implementable with disengaged shift element K0
  a greater range is possible in a hybrid operation;
  the internal combustion engine VKM can be started by the second electric machine EM2;
  the second electric machine EM2 can synchronize the shift element K0;
  a battery-independent serial operation is possible; and
  the second electric machine EM2 can be used as a generator, the first electric machine can be used as a motor.

Due to the additional shift element G, as described above, an EDA mode for forward travel can be implemented.

In addition, a purely electric EDA mode can be implemented (K0 disengaged, G engaged). As a result, driving can also take place for a longer time with high torque and a low ground speed without the electric machine or the inverter overheating, since both electric machines can be operated at suitable rotational speeds. An operation at very low rotational speeds of the electric machines is avoided.

In addition, in the purely electric EDA mode, a purely electric gear shift (EDS) is possible (K0 is disengaged while the shift element G is engaged), i.e., the electric gears of the first electric machine EM1 are power shiftable among one another. It is advantageous here that the first electric machine EM1 also contributes the greatest portion of the drive power during the gear shift, while the second electric machine EM2 can therefore be dimensioned considerably smaller (for example, only approximately ⅓ the power of EM1).

With respect to the shift conditions during hybrid/during internal combustion engine-driven travel, wherein the launch clutch K0 is engaged in this case, reference is made to the example embodiment from FIG. 11.

Figure 16:
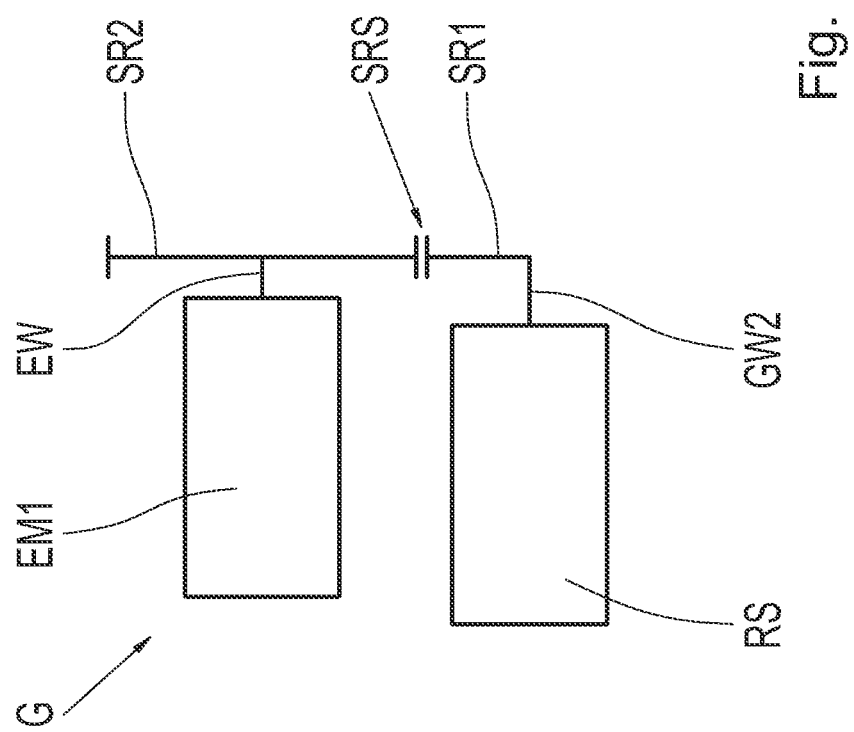

Finally, FIGS. 16 through 21 show modifications of the example transmissions G from FIGS. 2 through 10 as well as 12 through 14. These modifications relate to example alternative possibilities for integrating the electric machine EM1, although they can also be utilized, in a similar way, for the further electric machine EM2 in the example transmissions G according to FIGS. 12 through 14. In FIG. 16, for example, the electric machine EM1 is not located coaxially to the particular gear set RS (not represented in greater detail here) of the transmission G, but rather is arranged axially offset with respect thereto. A connection takes place via a spur gear stage SRS, which is composed of a first spur gear SR1 and a second spur gear SR2. The first spur gear SR1 is connected at the second input shaft GW2 in a rotationally fixed manner on the side of the particular gear set RS. The spur gear SR1 then meshes with the spur gear SR2, which is located on an input shaft EW of the electric machine EM1 in a rotationally fixed manner. Within the electric machine EM1, the input shaft EW establishes the connection at the rotor (not represented further in this case) of the electric machine EM1.

Figure 17:
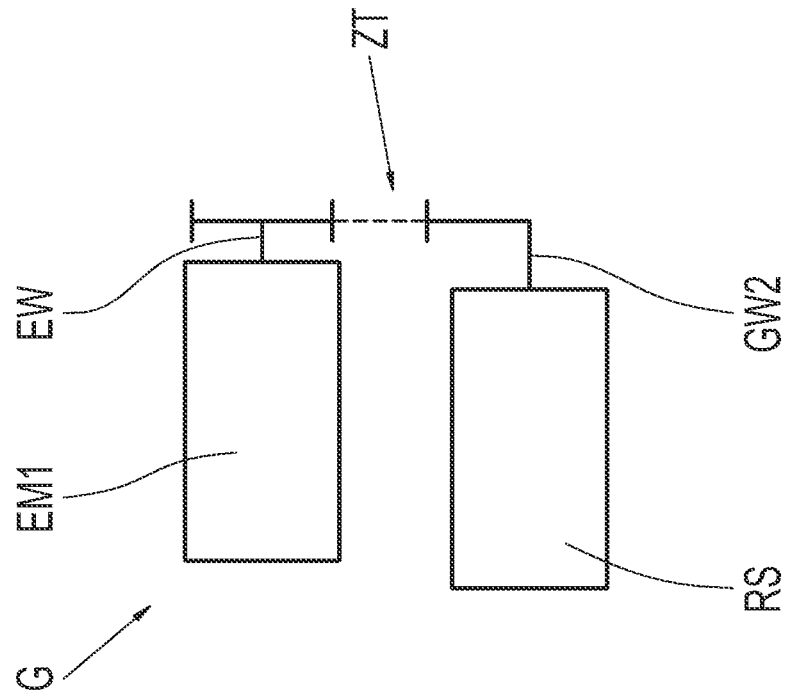

In the case of the example modification according to FIG. 17 as well, the electric machine EM1 is located axially offset with respect to the particular gear set RS of the particular transmission G. In contrast to the preceding example variant according to FIG. 16, a connection is not established in this case via a spur gear stage SRS, however, but rather via a flexible traction drive mechanism ZT. This flexible traction drive mechanism ZT can be configured as a belt drive or also a chain drive. The flexible traction drive mechanism ZT is then connected at the second input shaft GW2 on the side of the particular gear set RS. Via the flexible traction drive mechanism ZT, a coupling to an input shaft EW of the electric machine EM1 is then established. Within the electric machine EM1, the input shaft EW establishes a connection at the rotor of the electric machine.

Figure 18:
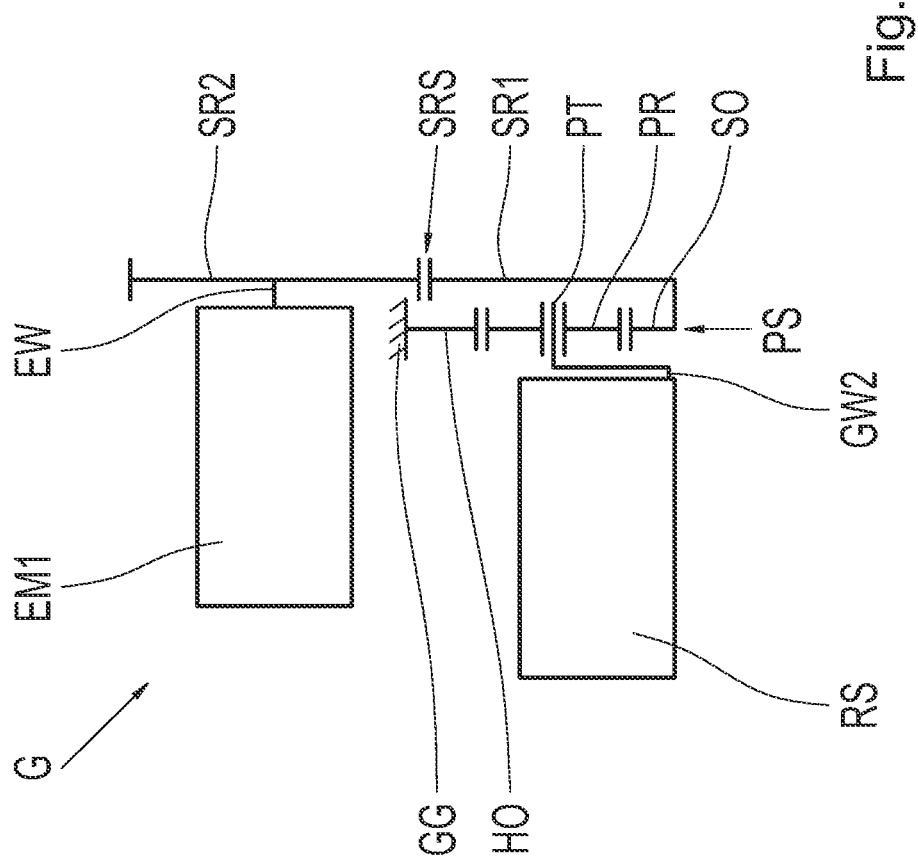

In the case of the example modification according to FIG. 18, an integration of the electric machine EM1, which is located axially offset with respect to the particular gear set RS, is implemented via a planetary gear stage PS and a spur gear stage SRS. The planetary gear stage PS is connected downstream from the gear set RS, wherein, on the output end of the planetary gear stage PS, the spur gear stage SRS is then provided, via which the connection to the electric machine EM1 is established. The planetary gear stage PS is composed of a ring gear HO, a planet carrier PT, and a sun gear SO, wherein the planet carrier PT guides, in a rotatably mounted manner, at least one planet gear PR, which is meshed with the sun gear SO as well as with the ring gear HO.

In the present case, the planet carrier PT is connected at the second input shaft GW2 in a rotationally fixed manner on the side of the gear set RS from FIGS. 2 through 10 as well as 12 through 14. By comparison, the ring gear HO is permanently fixed at the rotationally fixed component GG, while the sun gear SO is rotationally fixed to a first spur gear SR1 of the spur gear stage SRS. The first spur gear SR1 then meshes with a second spur gear SR2 of the spur gear stage SRS, which is provided, in a rotationally fixed manner, on an input shaft EW of the electric machine EM1. In this case, the electric machine EM1 is therefore connected by the gear set RS via two gear stages.

Figure 19:
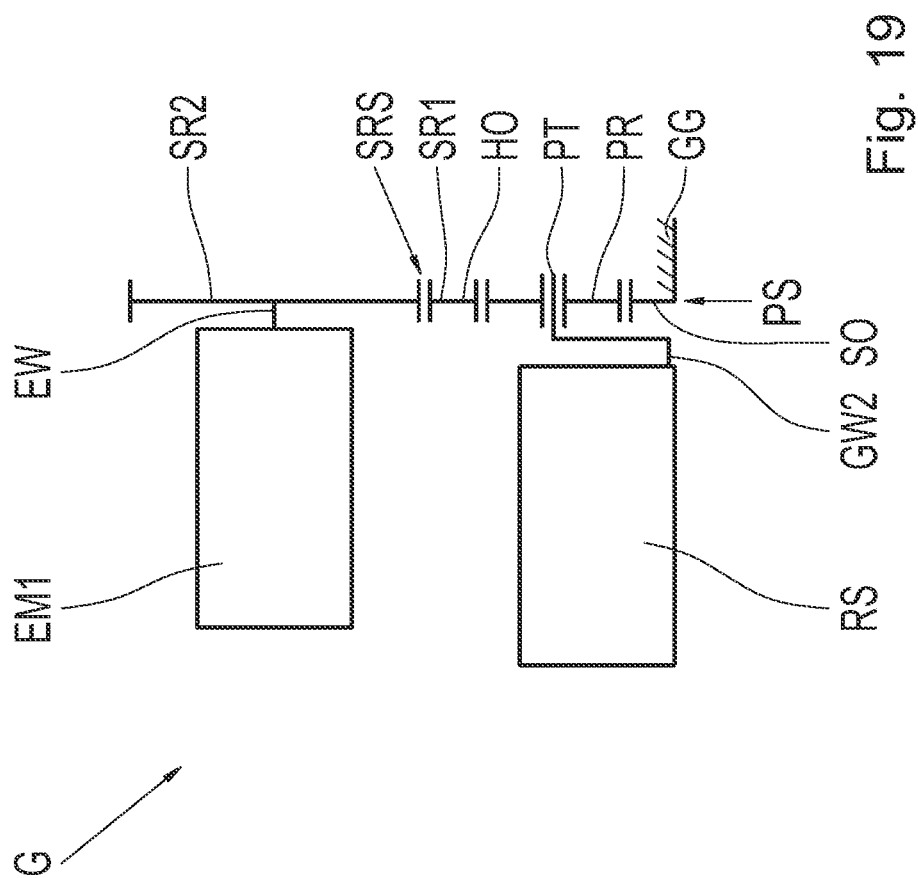

In the case of the example modification from FIG. 19 as well, an integration of the electric machine EM1 is implemented by the gear set RS via a planetary gear stage PS and a spur gear stage SRS. The modification largely corresponds to the example variant according to FIG. 18, with the difference that, with respect to the planetary gear stage PS, the sun gear SO is now fixed at the rotationally fixed component GG, while the ring gear HO is rotationally fixed to the first spur gear SR1 of the spur gear stage SRS. Specifically, the ring gear HO and the first spur gear SR1 are preferably designed as one piece, in that the ring gear HO is equipped, at an outer circumference, with a tooth system. For the rest, the example modification according to FIG. 19 corresponds to the example variant according to FIG. 18, and therefore reference is made to the description thereof.

Figure 20:
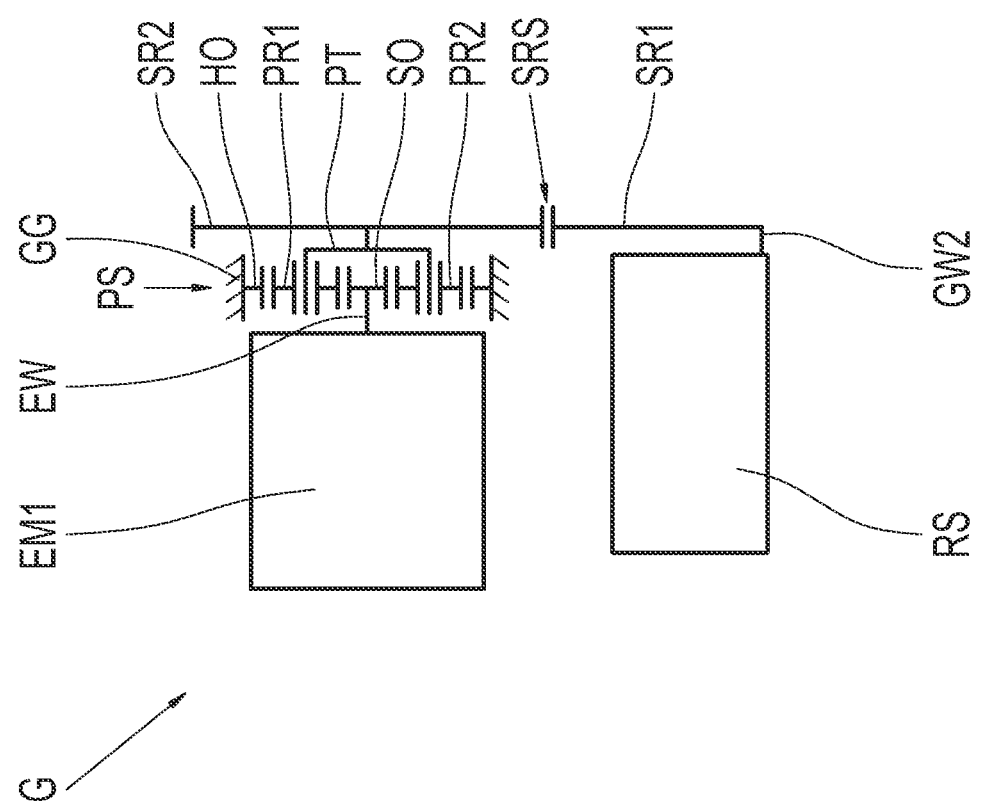

Moreover, FIG. 20 shows one further example modification of the transmissions G from FIGS. 2 through 10 as well as 12 through 14, wherein, in this case as well, an integration of the electric machine EM1 is implemented via a spur gear stage SRS and a planetary gear stage PS. In contrast to the preceding example variant according to FIG. 15, the gear set RS is initially followed here by the spur gear stage SRS, while the planetary gear stage PS is provided in the power flow between the spur gear stage SRS and the electric machine EM1. The planetary gear stage PS also includes, once again, the elements ring gear HO, planet carrier PT, and sun gear SO, wherein the planet carrier PT guides, in a rotatably mounted manner, multiple planet gears PR1 and PR2, each of which is meshed with the sun gear SO as well as with the ring gear HO.

As is apparent in FIG. 20, a first spur gear SR1 of the spur gear stage SRS is connected in a rotationally fixed manner on the side of the gear stage RS of the transmissions G from FIGS. 2 through 10 as well as 12 through 14, wherein this connection is completed at the second input shaft GW2. The first spur gear SR1 then meshes with a second spur gear SR2 of the spur gear stage SRS, which is rotationally fixed to the planet carrier PT of the planetary gear stage PS. The ring gear HO is permanently fixed at the rotationally fixed component GG, while the sun gear SO is provided, in a rotationally fixed manner, on an input shaft EW of the electric machine EM1.

Finally, FIG. 21 shows one further modification of the transmissions G from FIGS. 2 through 10 as well as 12 through 14, wherein this modification essentially corresponds to the preceding example variant according to FIG. 20. The only difference is that the sun gear SO of the planetary gear stage PS is now permanently fixed at the rotationally fixed component GG, while the ring gear HO of the planetary gear stage PS is rotationally fixed to the input shaft EW of the electric machine EM1. For the rest, the example modification according to FIG. 21 corresponds to the example variant according to FIG. 20, and therefore reference is made to the description thereof.

By the example embodiments according to the invention, a transmission having a compact design and good efficiency can be implemented.

Example aspects of the invention were comprehensively described and explained with reference to the drawings and the description. The description and the explanation are to be understood as an example and are not to be understood as limiting. The invention is not limited to the disclosed embodiments. Other embodiments or variations result for a person skilled in the art within the scope of the utilization of the present invention and within the scope of a precise analysis of the drawings, the disclosure, and the following claims. For example, in particular, the interlock example variants for the second shift element are arbitrarily combinable with the interlock example variants for the sixth shift element.

In the claims, the words "comprise" and "comprising" do not rule out the presence of further elements or steps. The indefinite article "a" does not rule out the presence of a plurality. A single element or a single unit can carry out the functions of several of the units mentioned in the claims. The mere mention of a few measures in multiple various dependent claims is not to be understood to mean that a combination of these measures cannot also be advantageously utilized.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
RS gear set
GG rotationally fixed component
P1 first planetary gear set
E11 first element of the first planetary gear set
E21 second element of the first planetary gear set
E31 third element of the first planetary gear set
P2 second planetary gear set
E12 first element of the second planetary gear set
E22 second element of the second planetary gear set
E32 third element of the second planetary gear set
P3 third planetary gear set
E13 first element of the third planetary gear set
E23 second element of the third planetary gear set
E33 third element of the third planetary gear set
A first shift element
B second shift element
C third shift element
D fourth shift element
E fifth shift element
F sixth shift element
K seventh shift element
K0 eighth shift element
SP1 shift element pair
SP2 shift element pair
SP3 shift element pair
1 first gear
2 second gear
3.1 third gear
3.2 third gear
3.3 third gear
3.4 third gear
3.5 third gear
V3 third gear, internal combustion engine-driven
4.1 fourth gear
4.2 fourth gear
4.3 fourth gear
4.4 fourth gear V4 fourth gear, internal combustion engine-driven
ZG auxiliary gear
E1 first gear, electric
E2 second gear, electric
E3 third gear, electric
E4 fourth gear, electric
GW1 first input shaft
GW1-A mounting interface
GW2 second input shaft
GWA output shaft
GWA-A mounting interface
AN connection shaft
EM1 electric machine
S1 stator
R1 rotor
EM2 electric machine
S2 stator
R2 rotor
SRS spur gear stage
SR1 spur gear
SR2 spur gear
PS planetary gear stage
HO ring gear
PT planet carrier
PR planet gear
PR1 planet gear
PR2 planet gear
SO sun gear
ZT flexible traction drive mechanism
VKM internal combustion engine
TS torsional vibration damper
AG differential gear
DW driving wheels

The invention claimed is:

1. A transmission (G) for a motor vehicle, comprising:
an electric machine (EM1);
a first input shaft (GW1);
a second input shaft (GW2);
an output shaft (GWA);
a first planetary gear set (P1), a second planetary gear set (P2), and a third planetary gear set (P3), each of the first, second, and third planetary gear sets (P1, P2, P3) comprising a respective plurality of elements (E11, E21, E31, E12, E22, E32, E13, E23, E33);
a first shift element (A), a second shift element (B), a third shift element (C), a fourth shift element (D), a fifth shift element (E), and a sixth shift element (F); and
the electric machine (EM1), a rotor (R1) of the electric machine (EM1) connected to the second input shaft (GW2),
wherein the first input shaft (GW1) is rotationally fixed to a second element (E21) of the first planetary gear set (P1),
wherein the second input shaft (GW2) is rotationally fixed to a third element (E32) of the second planetary gear set (P2),
wherein the first element (E11) of the first planetary gear set (P1) is fixed at a rotationally fixed component (GG),
wherein the third planetary gear set (P3) comprises a first coupling of the first element (E13) of the third planetary gear set (P3) with the rotationally fixed component (GG), a second coupling of the second element (E23) of the third planetary gear set (P3) with the output shaft (GWA), and a third coupling of a third element (E33) of the third planetary gear set (P3) with a second element (E22) of the second planetary gear set (P2), two couplings of the first, second, and third couplings of the third planetary gear set (P3) are rotationally fixed connections, and the other of the first, second, and third couplings of the third planetary gear set (P3) is a rotationally fixed connection establishable by the first shift element (A, A', A"),
wherein the second shift element (B) is configured for rotationally fixing the output shaft (GWA) to the input shaft (GW1),
wherein the third shift element (C) is configured for rotationally fixing the output shaft (GWA) to a third element (E31) of the first planetary gear set (P1),
wherein the fourth shift element (D) is configured for rotationally fixing the first input shaft (GW1) to the third element (E33) of the third planetary gear set (P3),
wherein the fifth shift element (E) is configured for rotationally fixing the first input shaft (GW1) to the second input shaft (GW2), and
wherein the sixth shift element (F, F', F") is configured either for interlocking the third planetary gear set (P3) or for connecting the output shaft (GWA) with the second element (E22) of the second planetary gear set.

2. The transmission (G) of claim 1, wherein, by selective engagement of the six shift elements (A, B, C, D, E, F):
a first gear (1) results between the first input shaft (GW1) and the output shaft (GWA) by actuating the first shift element (A) and the fifth shift element (E);
a second gear (2) results between the first input shaft (GW1) and the output shaft (GWA) by actuating the first shift element (A) and the fourth shift element (D);
a third gear results between the first input shaft (GW1) and the output shaft (GWA) in a first variant (3.1) by actuating the first shift element (A) and the second shift element (B), in a second variant (3.2) by actuating the second shift element (B) and the sixth shift element (F), in a third variant (3.3) by actuating the fourth shift element (D) and the sixth shift element (F), in a fourth variant (3.4) by actuating the second shift element (B) and the fourth shift element (D), and in a fifth variant (3.5) by actuating the second shift element (B) and the fifth shift element (E);
a fourth gear results between the first input shaft (GW1) and the output shaft (GWA) in a first variant (4.1) by actuating the first shift element (A) and the third shift element (C), in a second variant (4.2) by engaging the third shift element (C) and the sixth shift element (F), in a third variant (4.3) by actuating the third shift element (C) and the fourth shift element (D), and in a fourth variant (4.4) by actuating the third shift element (C) and the fifth shift element (E); and
an auxiliary gear (HZG) results by engaging the fifth shift element (E) and the sixth shift element (F).

3. The transmission (G) of claim 1, wherein:
a first gear (E2) results between the second input shaft (GW2) and the output shaft (GWA) by engaging the first shift element (A); and
a second gear (E2) results between the second input shaft (GW2) and the output shaft (GWA) by actuating the sixth shift element (F).

4. The transmission (G) of claim 1, wherein the first, second, and third planetary gear sets (P1, P2, P3) are arranged in an axial direction starting from a transmission input in the sequence first planetary gear set (P1), second planetary gear set (P2), third planetary gear set (P3).

5. The transmission (G) of claim 1, wherein the first, second, and third planetary gear sets (P1, P2, P3) are arranged in an axial direction starting from a transmission input in the sequence second planetary gear set (P2), third planetary gear set (P3), first planetary gear set (P1).

6. The transmission (G) of claim 5, further comprising a seventh shift element (K) arranged and configured such that, in an actuated condition, the seventh shift element (K) connects the first input shaft (GW1) with the first element (E13) of the third planetary gear set (P3) in a rotationally fixed manner.

7. The transmission (G) of claim 1, further comprising an additional electric machine (EM2), a rotor (R2) of the additional electric machine (EM2) connected at the first input shaft (GW1).

8. The transmission (G) of claim 1, further comprising a connection shaft (AN) and an eighth shift element (K0), the first input shaft (GW1) rotationally fixable to the connection shaft (AN) via the eighth shift element (K0).

9. The transmission (G) of claim 1, wherein one or more of the first, second, third, fourth, fifth, and six shift elements (A, B, C, D, E, F, G, K0) is a form-locking shift element.

10. The transmission (G) of claim 1, wherein the rotor (R1) of the electric machine (EM1) is rotationally fixed to the second input shaft (GW2) or is connected to the second input shaft (GW2) via at least one gear stage.

11. A motor vehicle drive train for a hybrid or electric vehicle, comprising the transmission (G) of claim 1.

12. A method for operating the transmission (G) of claim 1, wherein only the fourth shift element (D) is engaged in order to implement a charging operation or a starting operation.

\* \* \* \* \*